US006824828B2

(12) United States Patent
Su et al.

(10) Patent No.: US 6,824,828 B2
(45) Date of Patent: Nov. 30, 2004

(54) METHOD FOR FORMING MULTILAYER RELEASE LINERS

(75) Inventors: Wen-Chen Su, La Verne, CA (US); Luigi Sartor, Pasadena, CA (US); Kuolih Tsai, Arcadia, CA (US); Frank Yen-Jer Shih, Arcadia, CA (US); Daniel Meyer, Glendora, CA (US); Stephen Huff, Chino Hills, CA (US); Bert Potjer, Voorschoten (NL); Hongjie Guo, Arcadia, CA (US); Aad van Zanten, Alphen aan den Rijn (NL); Arnooud H. Kettenis, Alphen aan den Rijn (NL); William Kray, Upland, CA (US); Adrian Hulme, Mentor, OH (US); Alexander Jansen, Zoetermeer (NL); Robert Dordick, Sherman Oaks, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 10/215,430

(22) Filed: Aug. 8, 2002

(65) Prior Publication Data

US 2003/0087038 A1 May 8, 2003

Related U.S. Application Data

(60) Division of application No. 09/918,652, filed on Mar. 22, 2000, which is a continuation-in-part of application No. 09/389,167, filed on Sep. 2, 1999, now abandoned, which is a continuation of application No. 08/616,859, filed on Mar. 15, 1996, now Pat. No. 5,962,075, which is a continuation-in-part of application No. 08/483,509, filed on Jun. 7, 1995, now Pat. No. 5,728,430.

(51) Int. Cl.⁷ ............................................... B05D 1/36

(52) U.S. Cl. ..................... 427/356; 427/358; 427/407.1; 427/411; 427/412.1; 427/412.2; 427/412.5; 427/402; 427/420

(58) Field of Search ................................. 427/356, 358, 427/420, 407.1, 411, 412.1, 402, 412.2, 412.5; 118/411

(56) References Cited

U.S. PATENT DOCUMENTS 2,681,294 A   6/1954   Benguin (List continued on next page.)

FOREIGN PATENT DOCUMENTS

CA   1018838   10/1977

(List continued on next page.)

OTHER PUBLICATIONS

Denis Cohen, "Two–Layer Slot Coating: Flow Visualization and Modeling".
Denis Cohen, "Design Optimization and Comparison of Permetered Coating Methods".
David J. Iscanlan Two–Slot Coater Analysis: Inner Layers Separation Issues in Two–Layer Coating.
Luigi Sartor, "Slot Coating: Fluid Mechanics and Die Design," PhD Thesis, University of Minnesota, Sep., 1990, vol. 1, Ch. 2, vol. II, Ch. 3.

Primary Examiner—Katherine A. Bareford
(74) Attorney, Agent, or Firm—Gerald E. Hespos; Anthony J. Casella

(57) ABSTRACT

Disclosed herein is a multilayer silicone release surface comprising a backing, a support layer on the backing, and a silicone layer of the support layer. The various layers of the multilayer release surface are deposited substantially simultaneously, as for example by a dual die or using curtain coating techniques.

19 Claims, 17 Drawing Sheets

U.S. PATENT DOCUMENTS

| | | |
|---|---|---|
| 2,761,417 A | 9/1956 | Russell et al. |
| 2,761,418 A | 9/1956 | Russell et al. |
| 2,761,419 A | 9/1956 | Mercier et al. |
| 2,761,791 A | 9/1956 | Russell |
| 2,901,770 A | 9/1959 | Beck |
| 2,932,855 A | 4/1960 | Bartlett et al. |
| 3,005,440 A | 10/1961 | Padday |
| 3,206,323 A | 9/1965 | Miller et al. |
| 3,413,143 A | 11/1968 | Cameron et al. |
| 3,502,494 A | 3/1970 | Ishiwata et al. |
| 3,508,947 A | 4/1970 | Hughes |
| 3,526,528 A | 9/1970 | Takahashi et al. |
| 3,573,965 A * | 4/1971 | Ishiwata .................... 427/402 |
| 3,584,600 A | 6/1971 | Ishiwata et al. |
| 3,607,345 A | 9/1971 | Thomas et al. |
| 3,627,564 A | 12/1971 | Mercier |
| 3,916,043 A | 10/1975 | Fowble |
| 3,928,678 A | 12/1975 | Jackson et al. |
| 3,928,679 A | 12/1975 | Jackson et al. |
| 4,001,024 A | 1/1977 | Dittman et al. |
| 4,113,903 A | 9/1978 | Choinski |
| 4,154,879 A | 5/1979 | Choinski |
| 4,233,346 A | 11/1980 | Kerkhofs |
| 4,348,432 A | 9/1982 | Huang |
| 4,375,498 A | 3/1983 | Le Minez et al. |
| 4,384,015 A | 5/1983 | Koepke et al. |
| 4,413,082 A | 11/1983 | Gleichenhagen et al. |
| 4,440,811 A | 4/1984 | Hitaka et al. |
| 4,445,458 A | 5/1984 | O'Brien |
| 4,476,165 A | 10/1984 | McIntyre |
| 4,479,987 A | 10/1984 | Koepke et al. |
| 4,489,671 A | 12/1984 | Choinski |
| 4,525,392 A | 6/1985 | Ishizaki et al. |
| 4,569,863 A | 2/1986 | Koepke et al. |
| 4,572,849 A | 2/1986 | Koepke et al. |
| 4,647,475 A | 3/1987 | Inukai et al. |
| 4,677,017 A | 6/1987 | DeAntonis et al. |
| 4,835,021 A | 5/1989 | Fronheiser |
| 4,842,900 A | 6/1989 | Miyamoto |
| 4,844,946 A | 7/1989 | Komatsu et al. |
| 4,854,262 A | 8/1989 | Chino et al. |
| 4,863,765 A | 9/1989 | Ishizuka |
| 4,874,633 A | 10/1989 | Komatsu et al. |
| 4,877,639 A | 10/1989 | Willemsens et al. |
| 4,894,259 A | 1/1990 | Kuller |
| 4,927,665 A | 5/1990 | Chino et al. |
| 4,976,999 A | 12/1990 | Ishizuka |
| 4,977,852 A | 12/1990 | Ishizuka |
| 4,994,306 A | 2/1991 | Takahashi et al. |
| 5,030,484 A | 7/1991 | Chino et al. |
| 5,069,934 A | 12/1991 | Chino et al. |
| 5,072,688 A | 12/1991 | Chino et al. |
| 5,112,424 A | 5/1992 | Cook |
| 5,196,504 A | 3/1993 | Scholz et al. |
| 5,229,212 A | 7/1993 | Reed |
| 5,256,357 A | 10/1993 | Hayward |
| 5,348,768 A | 9/1994 | Shibata et al. |
| 5,425,967 A | 6/1995 | Tomaru |
| 5,464,577 A | 11/1995 | Leonard et al. |
| 5,510,190 A * | 4/1996 | Allen et al. .................. 428/448 |
| 5,518,773 A | 5/1996 | Shibata et al. |
| 5,558,913 A | 9/1996 | Sasaki et al. |
| 5,700,571 A | 12/1997 | Logue et al. |
| 5,928,726 A * | 7/1999 | Butler et al. .................. 427/261 |
| 5,945,174 A | 8/1999 | Shaw et al. |
| 6,365,254 B1 * | 4/2002 | Zoller et al. ................. 428/40.1 |

FOREIGN PATENT DOCUMENTS

| | | |
|---|---|---|
| DE | 3235151 | 3/1984 |
| EP | 566124 | 10/1993 |
| FR | 2043013 | 2/1971 |
| GB | 1029017 | 5/1966 |
| GB | 1219225 | 1/1971 |
| GB | 2031301 | 4/1980 |
| GB | 2120132 | 11/1983 |
| JP | 61-111168 | 5/1966 |
| JP | 71-016830 | 5/1971 |
| WO | 91/11750 | 8/1991 |
| WO | 95/29763 | 11/1995 |

* cited by examiner

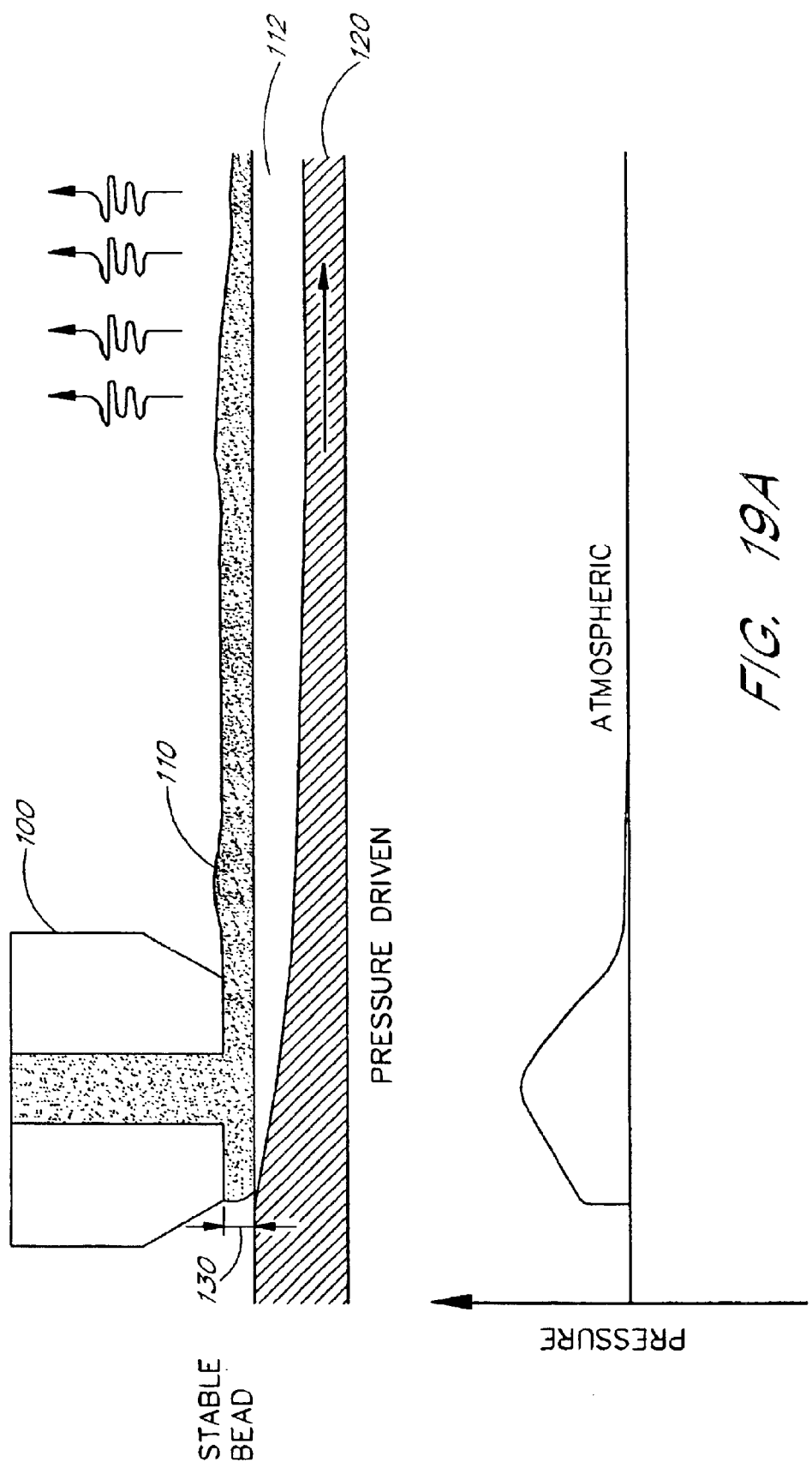

METHOD FOR FORMING MULTILAYER RELEASE LINERS

CROSS-REFERENCE TO RELATED APPLICATIONS

This application is a divisional of U.S. application Ser. No. 09/918,652, filed Mar. 22, 2000 which is a continuation-in-part of U.S. application Ser. No. 09/389,167, filed Sep. 2, 1999, now abandoned which is a continuation of U.S. application Ser. No. 08/616,859, filed Mar. 15, 1996, issued as U.S. Pat. No. 5,962,075, which is a continuation-in-part of application Ser. No. 08/483,509, filed Jun. 7, 1995, now issued as U.S. Pat. No. 5,728,430, the entirety of each of which are incorporated by reference as if fully set forth herein.

FIELD OF THE INVENTION

The present invention generally relates to release surfaces of the type used with pressure-sensitive adhesive (PSA) constructions. More particularly, the present invention relates to multilayer release liners and their methods of manufacture.

BACKGROUND OF THE INVENTION

A pressure-sensitive adhesive construction, such as a label, generally comprises a facestock or label surface, an adhesive composition adhered to the facestock, and a release liner. The adhesive composition is typically coated on a silicone-containing release surface of the liner. Alternately, the PSA can directly be coated onto the facestock and then be laminated to the release liner. In these combinations, the release liner protects the PSA prior to the label being used and is removed immediately prior to application of the label to another surface. Additionally, the release liner serves to facilitate cost effective manufacture of rolls or sheets of labels. The release liner also functions as a carrier of labels for dispensing in automatic labeling operations and for computer printing in EDP applications. The performance attributes of a release liner are critical to both the manufacture and end-use application of adhesive labels.

In conventional practice, the release liner is provided as a silicone layer on a paper or film surface having high holdout, i.e., the surface of the paper on which the silicone layer is deposited is resistant to silicone penetration. This is preferred because silicone tends to be an expensive component of a release liner, and it is therefore desirable to minimize the amount of silicone coated. High quality papers conventionally used in the manufacture of release liners, such as a super-calendered or densified glossy paper, achieve this goal by providing a surface which absorbs much less silicone than regular open paper. However, use of these high quality papers increases the cost of the end product adhesive construction, because such papers are typically much more expensive than regular open papers.

One currently accepted way of applying a silicone release composition to a high holdout paper is by solvent coating. Growing concern over the environment has imposed stringent restrictions regarding recovery of the solvent used in applying the solvent based silicone to the high-holdout backing paper or other materials. An alternative to this is to use 100% solids silicone release compositions. These are supplied with a viscosity (usually <2000 cps) suitable for roll-coating techniques. When applied to porous low cost papers, such as machine finished (MF) or machine glazed (MG) papers, these materials soak into the paper (penetrate the paper surface) to give ineffective coverage of the paper fibers unless excessively high quantities of expensive silicone are used. Ineffective coverage of the paper fibers provides unsuitable release liners for PSA applications, especially where high speed convertibility is an essential performance feature.

One proposed prior art solution to these problems is to use low cost open papers which have been pre-coated with a support layer comprising an inexpensive filler material, and then to coat the silicone layer onto the support layer. The filler material of the support layer flows into the pores and interstices of the open paper surface which would otherwise absorb silicone if the silicone were directly coated onto the paper. Consequently, less silicone is needed to form an adequate release surface. An example of this approach may be found in U.S. Pat. No. 4,859,511 to Patterson. However, there are several drawbacks to this prior art process. First, additional costs are incurred because the prior art methods require two coating steps. The prior art teaches that the support layer must first be coated and then dried, cured or hardened before the silicone layer may be coated. Otherwise, there is a potential for undesirable intermixing or destruction of the respective layers. Second, because two separate coating steps are required, more time is needed for the overall formation of the release liner. These additional processing costs somewhat offset the savings realized in materials by using support layers in combination with lower cost open papers.

Thus, there is a need for improved methods of forming multilayer release surfaces in which a support layer is used in conjunction with a silicone layer to form a release liner.

SUMMARY OF THE INVENTION

The present invention advantageously provides an efficient method of creating multilayer release liners, thereby overcoming the problems resulting from the prior art processes. The present invention achieves these benefits by providing a method of coating both a support layer and a release layer on a substrate substantially simultaneously. Consequently, separate coating steps are eliminated, and a corresponding savings in both time and costs are achieved.

Generally, these advantageous results may be achieved by at least two different coating methods. The first method achieves these results by modifying the die used to coat the support layer and a release layer (e.g., silicone layer) so that the die can dispense the fluids of both layers substantially simultaneously at a single coating station. The die dispenses the support layer onto the substrate, and substantially simultaneously, the release layer on the support layer. There is no need for a separate drying, hardening or curing step to prevent the layers from intermixing. By controlling the coating gap between the die and substrate, the processing conditions of the modified die may be optimized to achieve the most stable and efficient deposition of these layers. In some embodiments, application of controlled vacuum to the dual die coating process may be used to improve coating efficiency, increase coating tolerances and provide for less penetration of coated fluids onto the substrate to be coated. The multilayer release surfaces resulting from the simultaneous dual die coating of support layer and silicone-containing layer are also believed to have a unique morphology and advantageous properties.

Simultaneous coating of the support and release layers to form a multilayer release surface may also be achieved by curtain coating. For example, a slide coat die may be modified to have two slots, with the upper slot metering the release layer and the lower slot the support layer. The release layer and support layer combine on the die face surface, and fall to the moving substrate as a multilayer liquid sheet. The distance between the die and the substrate may range from 5 cm to 50 cm, and more preferably, from 10 cm to 30 cm.

Advantageously, curtain coating techniques do not require as precise an optimization of the coating gap between the die and the substrate to generate high speed coatings, and high coating speeds are easily obtained.

With respect to simultaneous coatings using a dual die, the present invention provides a method that is capable, at steady state coating conditions, of precisely controlling the interface or "separating streamline" between the support layer and silicone-containing layer as these layers are being coated onto the substrate. Unlike single-layer coating, the stability of the flow (i.e., its tendency to exhibit only a steady, two-dimensional flow) particularly at the separating streamline between the two layers, is extremely important. Advantageously, this method can be used to substantially simultaneously coat a support layer on a backing in conjunction with a silicone-containing release layer on the support layer. As used herein, substantially simultaneously refers to two or more liquid layers being deposited at a single coating station without an intermediate drying, curing, or hardening step for the support layer. For die coating, preferably, the single coating station comprises the dual die described herein, although this is not essential to the present invention. For example, the single coating station may comprise two separate dies located close enough spatially to achieve the benefits of a dual die.

The present dual die method involves a number of preliminary steps, the sequence of which is not particularly important. These steps include an analysis of certain parameters of the liquids to be coated, the particular and precise design of the geometries of the die lips, and the assembly or setup of the die with respect to the moving web. Following these steps, a number of experimental release-surface coatings can be made in order to determine an operating window for achieving successful multilayer dual die coating. Even within this window, a higher quality window can be determined for full production coating operation. These steps assist in providing a stable, two-dimensional flow.

An unstable flow changes its profile with respect to time. This can result in random fluctuations or regular oscillations in the flow profile, thus causing irregularities in the cross-sectional film configuration. In addition, slight perturbations in the coating process under unstable conditions may propagate, rather than dampen out quickly to a steady state condition as with stable flow. Likewise, a three-dimensional flow may result in undesirable mixing of the two layers, or in cross-web, nonuniform layer thickness, as well as other defects such as non-continuous layers or voids, etc. In stable, two-dimensional flow each layer has greater uniformity, thus resulting in a product of higher integrity and performance. Furthermore, if the flow is perturbed, this type of flow will return to its steady, two-dimensional flow characteristics rapidly, thus minimizing any defects in the product.

The coating method of the dual die aspect of the present invention achieves a stable, two-dimensional flow by controlling the interface of the flow at its upstream most position, which is referred to herein as the separating streamline or separating line. This line is defined, in the sense of web travel, as the cross-web line where the topmost streamline of the bottom flow layer (i.e., support layer) first meets the bottommost streamline of the top flow layer (i.e., silicone-containing release layer). In the opposite direction, the separating line can be viewed as the location where the two flows separate from the die lips. Although the separating line runs completely across the web, when the die/web interface is shown from the side, it appears as a point. As noted, this separating line will occur in the region of the mouth of the downstream slot or feed gap where the flows of the bottom layer and top layer are confluent. For ease of reference, this region will be referred to herein as the "interface region." It will be understood that if the combined flow of the two layers is stable and two-dimensional in this interface region, and more particularly at the separating line, it is likely to retain such flow characteristics throughout the coating process, thus resulting in an improved end product.

In order to achieve such advantageous flow characteristics at the separating line, the multilayer coating method of the present invention assists in positioning that line at the downstream corner of a die middle lip. This corner presents a straight, two-dimensional line across the die. Thus, if the separating line is coincident at this corner, one will be assured of achieving stable, two-dimensional flow. For this reason, this corner is referred to herein as the "stability point." On the other hand, it will be appreciated that unstable or three-dimensional flow conditions can cause the separating line to occur at several locations in the interface region. For example, "recirculations" in the bottom layer flow can cause the top layer flow to be pulled upstream such that it separates from a position underneath the middle lip. Likewise, vortices or other stagnant flow in the top layer can cause the top layer to separate from the middle lip at a position within the feed gap of that flow.

Stable, two-dimensional flow characteristics in the dual die interface region are achieved in the present invention due in part to a method of regulating the pressure gradient such that the separating line is positioned at the stability point. In accordance with one method of the present invention, the pressure gradient can be regulated by designing and assembling a die having a particular middle lip geometry. This method of pressure regulation helps to pin or lock the separating line at the stability point. This is achieved, as the name implies, by regulating the pressure gradient in the interface region. As is well understood, the pressure gradient in this region is highly dependent on the coating gap and its relationship to the downstream film thickness. In accordance with complex but well understood principles of fluid mechanics, the pressure gradient created at a particular longitudinal portion in the bead is related to the coating gap at that point and the downstream thickness of that flow. Here, however, much care must be taken in the analysis. Indeed, for a single-layer coating the analysis is more direct, since there is only one flow, and one downstream film thickness. However, for a multilayer coating process, there are two or more flows. Thus, in a method for regulating the pressure gradient at a given point in the flow, the coating gap at that point and the downstream film thickness of the layer(s) formed by that flow must be analyzed in order to achieve proper lip design and positioning parameters.

Therefore, an analysis of the pressure gradient within a particular flow, and particularly the pressure gradient of the combined flow at the interface region, is quite complex.

The dual die method of the present invention designs the middle and downstream die lip geometries such that the pressure gradients in the flow fix the separating line at the stability point. In another aspect of the method, the middle lip may extend slightly toward the web. Therefore, the profile formed by the design of the middle and downstream lips of the die represent a step away from the web in the direction of web travel. This step configuration may be flat or parallel with respect to the web or angled with respect thereto. It may even exhibit other designs. It is only important that certain pressure gradients be maintained in the interface region, and particularly along the middle coating gap from the stability point toward the upstream corner of the middle lip.

It has been observed that the magnitude of the step may be in the range of 0 to about 100 microns inches when coating multilayer adhesive compositions. However, for dual die coating of a support layer and a silicone-containing layer, it is preferred to minimize or eliminate the step.

Consequently, for these multilayer release systems, it is presently preferred that any step be in the range of from 0 to about 50 microns, with the optimal step approaching zero. Minimizing or eliminating the step in this manner optimizes the multilayer coating process for silicone release system.

When a stepped design is used, it should be appreciated that the die lips stepped design affects the coating gap under both the middle and downstream lips in the interface region. Because the middle lip is stepped toward the web, the coating gap under this lip will be less than that under the downstream lip. As a result, for most multilayer coatings, if the die is correctly positioned with respect to the web, the pressure gradient under the middle lip will be very slightly positive to approximately zero, while the pressure gradient under the downstream lip will be negative. When these stepped dies are used with these pressure gradient differentials, the gap under the middle lip can be from two to three times the film thickness, with the corresponding pressure gradient under the middle lip again being from slightly positive to zero. Again, this relationship exists at least in the interface region close to the mouth of the downstream feed gap. Due to other lip designs (such as bevels) and adjustments in the angle of attack of the die, the relationship between the pressure gradients under the middle lip and under the downstream lip may vary differently. However, in the interface region it is important that the pressure gradient at or just upstream of that region not be excessively positive in the direction of web travel.

If the pressure gradient is too high in this region, certain instabilities in the flow may occur, resulting in coating defects. For example, in the absence of proper pressure gradient regulation, the bottom layer flow may exhibit "recirculation" under the middle lip. This could occur, for example, if the downward step in the middle lip is not properly adjusted, and an excessively large coating gap occurs in this region. Desirable pressure gradients may be achieved for dual die coating multilayer silicone release systems when the step of the middle and downstream lips is minimized. Furthermore, the coating gap of the middle and downstream lips may be from 2 to 3 times the total wet film thickness. A larger coating gap results in a highly positive pressure gradient in the bottom layer flow, causing it to actually flow upstream a short distance before turning around and flowing downstream, causing "recirculation" of the flow. One of the most serious disadvantages of such recirculations in the bottom layer flow is its tendency to pull the top layer flow upstream under the middle lip and away from the stability point. Thus, the separating line moves upstream and there is no assurance that the line will be formed in a straight and steady manner. Thus, mixing and diffusion between the two layers at their interface may increase. In addition, the flow may be mottled or blotchy. Other defects can be caused by recirculations. Recirculations are of two types: open loop and closed loop. Open-loop recirculations are less damaging because any liquid entering them leaves after a short period of time (low "residence time"), before continuing to flow downstream. Closed-loop recirculations, however, result in high residence time because the liquid is trapped in them. Moreover, all recirculations are known to prefer three-dimensional flow characteristics.

On the other hand, the pressure gradient under the middle lip cannot be too large (which might occur, for example, if the coating gap in this region were too small). Such a large pressure gradient is likely to result in upstream leakage of the fluid. Also, as mentioned above, such high pressure gradients can result in high shear stresses with other deleterious effects on the performance of the coating.

It will also be observed that the step designed into the middle lip can be achieved by positioning that lip at the proper coating gap and moving the downstream lip further away from the web. However, there is also a tradeoff in this parameter. If the coating gap under the downstream lip then becomes too large, recirculations or vortices in the top layer flow may result. One additional type of defect that may occur is known as "chatter", or a two-dimensional oscillation of the bead.

Thus, an important advantage of the method of the dual die aspects of present invention is that it provides a proper pressure gradient ahead of the interface region for the coating of multilayer silicone systems. However, as explained, this advantage can only be achieved when the die is correctly set with respect to the web in order to exhibit proper coating gap characteristics. Preferably, it has been found that the die should be set such that the coating gap under the middle lip (especially in the interface region) is approximately two to three times the bottom layer wet film thickness downstream of the die (before drying). It should be re-emphasized that this thickness, however, is the thickness of the bottom layer only which is being coated from this particular flow under the middle layer. Similarly, the coating gap under the downstream lip (particularly in the interface region) should be greater than one but not greater than three times the wet film thickness downstream, to provide the least pressure under the lips and therefore minimize flow of material into the paper. In this latter case, this thickness is the combined thickness of both layers as well as any previous layers. Thus, it will be understood that these principles apply to multilayer coating of any number of layers, with the terms "bottom layer" and "top layer" referring to any two adjacent layers. It will also be recognized that these relationships will slightly vary due to non-Newtonian characteristics of the liquid, as well as other variables.

On the other hand, the method of the present invention allows for optimization of the dual die multilayer coating process. In one aspect of the method, the middle and downstream lips are flat or parallel with respect to each other. Thus, any convergence of the downstream lip can be achieved by adjusting the angle of attack of the die. In another aspect of the method, however, the optimization of the coating process is facilitated by beveling the downstream lip so that it exhibits some convergence, even without any angle of attack adjustment. With this improvement the "operating window" of the die can be increased. This means that successful coating can be achieved, even if certain coating parameters cannot be accurately controlled. On the other hand, a larger operating window increases the chance of a larger quality window where the best coating occurs. Moreover, a large operating window allows a technician of less skill or experience to successfully perform the coating operation. In addition, a wider variety of products comprised of a broader range of liquids can be produced, even single-layer products.

In another aspect of the present invention, the upstream lip is also designed so that it steps toward the web with respect to the middle lip. This also achieves an increasing pressure gradient in the upstream direction and assists in sealing the bead under the die lips to avoid upstream leakage. There is always recirculation in the bottom layer under the upstream lip. However, typically, such recirculation is open so that it does not negatively affect the quality of the bottom layer. This upstream lip can be "flat" or parallel to the web, or it may be beveled or angled with respect thereto. Preferably, the bevel represents a divergence in the sense of the web travel. This profile presents a positive pressure gradient in the upstream direction, which further assists in sealing the bead.

When the upstream and downstream lips of the present method are beveled, the middle lip is preferably maintained close to flat (in the sense that it is approximately parallel to the web, not taking into consideration any curvature). This can be achieved, even during operation, since angle of attack adjustments are minimized due to the beveling of the aforementioned lips. The flatness of the middle lip, together with an appropriate coating gap, provides a zero pressure gradient to the flow, which advantageously avoids recirculations and still reduces shear rate and shear stresses, as discussed above. A flat middle lip also has the advantage of reducing the risk of upstream leakage. Moreover, this middle lip is the most expensive to manufacture, and the absence of a bevel assists in reducing costs.

It should be noted that other lip geometries are possible in order to achieve the advantages of the present invention. Also, other methods of pressure regulation are possible.

In another aspect of the present invention, pressure gradient regulation can also be achieved with lip designs of a particular length, especially that of the middle and downstream lips. That is, it will be appreciated that the length of the die lips will affect the coating gap if the angle of attack of the die is adjusted. Typically, with a negative angle of attack (a convergence of the die lips with the web in the downstream direction), the coating gap at the upstream portion of each lip is greater than at the downstream portion of each lip. This is especially true, considering the curvature of the back-up roll. As noted above, if coating gaps are too great, recirculations will occur due to inappropriate pressure gradients, thus causing the loss of control of separating line position and poor coating quality.

In addition, as noted above, the flow experiences shear stresses in the bead due primarily to the rapidly moving web. Even if the shear rate is tolerable with respect to fluid properties, the duration of the shear can have damaging effects on liquid quality. The longer the lips, the greater the duration of the shear stresses experienced by the liquid. Thus, it is important when designing the die lip geometries, to consider the length of the die lips for coating gap, as well as shear stress considerations.

Therefore, it is an important aspect of the present method that the lip lengths are minimized, while providing sufficient length to develop stable rectilinear flow. Perhaps the most important die lip length is the downstream lip. This lip must be long enough for the flow to develop. Such lip may be in the range of 0.1–3.0 mm in length, with about 0.8–1.2 mm being preferable. The middle lip also may range from 0.1–3.0 mm, but is preferably about 0.3–0.7 mm in length. The upper lip, on the other hand, can be longer without suffering shear stresses in the liquid because the length of travel is reduced. Moreover, a longer upstream lip assists in sealing the bead. Thus, a lip in the range of 1.0–3.0 mm is advantageous, with 1.5–2.5 mm being preferable.

Thus, the present method of multilayer coating has a downstream feed gap region characterized by a pressure gradient which generates stable flow at the interface between a bottom layer (including any previously coated layers) and a top layer. For the embodiments described above, this pressure gradient is achieved by a combination of middle lip and downstream lip geometries, which result in an adequate pressure gradient at the interface region which is not so positive as to cause recirculations.

In addition to the correct design of the die lip geometries and the assembly and setup of the die with respect to the web so that correct coating gaps are achieved, the present method also involves a careful analysis of certain fluid parameters with respect to the liquids to be coated on the web. In particular, the present method involves an analysis of the relative viscosities of the two liquids. Preferably, the viscosity of the top layer liquid should be greater than the viscosity of the bottom layer liquid. More specifically, a top layer viscosity which is about 30% greater than the bottom layer viscosity is optimal; however, successful multilayer coating can be achieved when the top layer viscosity ranges from about 50% less to 100% (or even more) more than the viscosity of the bottom layer. However, it will be recognized by those of ordinary skill that these ranges may vary even outside of these boundaries for a given set of coating parameters.

This balancing of viscosities is important in order to assist the process in achieving steady, two-dimensional flow. However, because the flow experiences such high shear rates, the viscosity analysis must take into consideration the change in viscosity due to such shear rates. Thus, for example, due to shear thinning, the viscosity of any liquid being coated may vary by several orders of magnitude of milliPascal-seconds (mPa-sec). At the same time, the shear rate may vary by four or more orders of magnitude with respect to the film coating parameters involved with the present method. In particular, shear rates above $1,000 \text{ s}^{-1}$ are likely to be experienced under such coating conditions. Accordingly, the relative viscosities of the liquids being coated should be compared at these higher shear rates.

In addition, the surface tensions of the respective liquids should be analyzed, with the top liquid preferably having a lower surface tension than the bottom liquid. This condition helps to avoid the formation of voids in the top layer with respect to the bottom layer which may be formed by de-wetting phenomena.

Once the lip geometries have been designed and set with respect to the die, and the liquid parameters analyzed, another important aspect of the present invention is the experimental determination of the area of operating parameters in which successful coating can be achieved. This area is often referred to as the "coating window" and may be defined in terms of a graph of coating gap versus angle of attack of the die. Thus, in order to determine a coating window, samples of the two liquids are experimentally coated at varying coating gaps and angles of attack and the coating quality is observed. The area where adequate coating is achieved is noted, including the area where very high quality coating is achieved (usually a subset of the overall coating window). It is preferable that the coating window be as large as possible so that inaccuracies in coating gap and/or angle of attack do not result in coating defects or product degradation. In order to add another dimension to the coating window, the same liquids being tested are also tested at various viscosities.

Once the coating window is determined, production coating may occur preferably at a point in the middle of the range of the angles of attack and close to the maximum coating gap and angle of attack.

When a dual die is used to simultaneously coat a support layer and release layer the resulting multilayer release surface has several desirable features. First, because the support layer and silicone layer are coated substantially simultaneously as liquids, the interface between the support layer and silicone layer is not as sharp and distinct as if the support layer had been cured or hardened prior to the coating of the silicone layer. This is beneficial for certain applications, because the increased dispersion observed between the layers facilitates binding of the silicone layer to the support layer, and therefore decreases the propensity of the silicone layer to rub-off or otherwise separate from the support layer. Second, because the coating parameters of the support layer and silicone layer are so tightly controlled by the present method, the degree of dispersion of the two layers is minimized to substantially the extent necessary to achieve desirable bonding between the support layer and the silicone layer, without undue waste of dispersed silicone in the support layer. Finally, dual die coating may be used to form a multilayer release surface from a support layer and release layer which would not form a stable curtain for curtain coating because the surface energies differ by too much.

The improved dispersion characteristics of the supporting and silicone layers comprising the multilayer release surfaces of the present invention can be characterized in several ways. One preferred way is by transmission electron microscopy (TEM). When TEM is applied to multilayer release systems of the prior art and the dual die constructs of the present invention, it is observed that two distinct layers, comprising the support layer and the silicone release layer, are formed from both processes. However, the borders of the layers of the prior art coatings are much sharper, indicating that there is minimal intermixing of the support layer and the silicone release layer. In contrast, TEM scans of multilayer release constructs of the present invention show that, while having well defined borders, there are a small amount of silicone domains in the support layer, which is indicative of desirable bonding within the layers.

In summary, the method of the present invention enhances the optimization of the coating process for multilayer release surfaces. The method can be utilized with a wide variety of coatings and substrates in order to produce multilayer release surfaces on open paper surfaces which have release properties equal to or better than those produced on high quality papers.

BRIEF DESCRIPTION OF THE DRAWINGS

FIGS. 19A–C are illustrative diagrams of a vacuum assisted die coating process.

DETAILED DESCRIPTION OF THE METHOD

Figure 1:
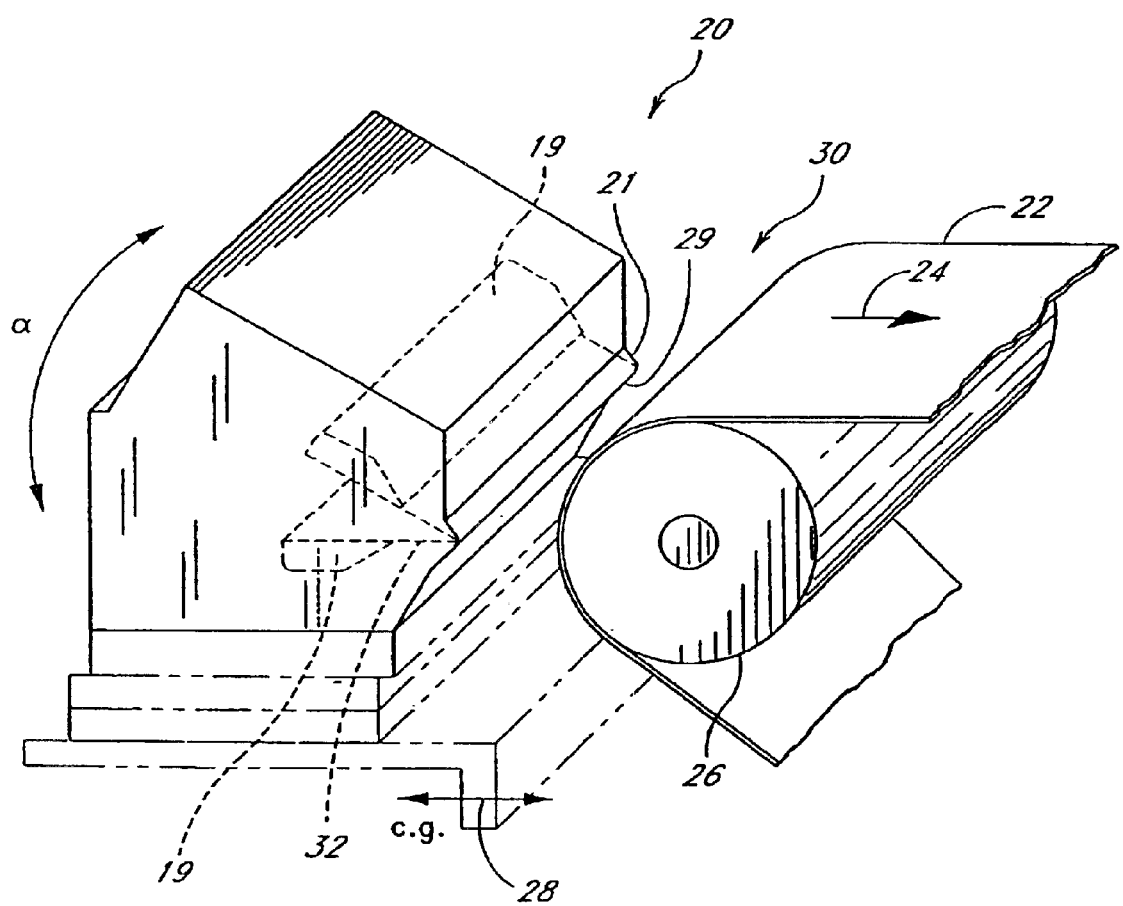
FIG. 1 is a perspective view of a multilayer die which may be utilized in the present method, the die being positioned adjacent to a moving web traveling around a back-up roll.

Before describing in detail the various steps of the methods of the present invention, it will be noted that the method is not limited to the coating of release surfaces having only two layers, but further comprises the coating of any number of a plurality of layers that may be incorporated into a release liner. Thus, the drawings and descriptions thereof should not be considered limiting with respect to the scope of the method of the present invention; moreover, such method should not be limited to any particular sequence with respect to its steps, except where expressly noted.

The present simultaneous coating method can advantageously be used with a variety of different substrates, support layer filler compositions and silicone materials. For example, the substrate to which the supporting and silicone layers are applied may be machine finished and machine glazed papers, such as RL-541 from Wasau Technical Papers, Data-60 and -70 from Crown Van-Gelder, AT-45 and AT-70 from Ahlstrom Paper Group, Willamette paper #50 EDP, Georgia Pacific vellumina papers, and NL-60 from Gascogne Paper Company, or any other type of relatively porous open paper may be used. Other papers which may be used include bag paper, calendared and non-calendared clay coated paper, latex saturated paper, and the like. Although the benefits of the present invention with respect to cost savings are more fully realized when relatively inexpensive open papers are used, it should be appreciated that the present invention can also be used with more expensive finished paper substrates, including those known to have a high holdout.

Furthermore, the substrate may comprise materials other than paper, such as polymeric films comprising polyethylene, polypropylene, polybutylene, or polyester films, such as polyethylene terephthalate, polyvinyl chlorides, polyvinylidene fluorides, polysulfides, polyamides and nylon polymers. Suitable substrates may also include combinations of the foregoing including combinations of paper and polymeric substrates. Preferably, when materials other than paper are used, the substrate may have a thickness of about 35–100 microns, and more preferably 35 to 65 microns, to more readily facilitate use with conventional coating, converting and dispensing machines. As will be appreciated by one of skill in the art, it is also preferred that the particular substrate be chosen to provide a surface which will adhere well to the filler material of the support layer, so that the resulting construct will not delaminate.

As noted above, the support layer is applied to the surface of the substrate, and flows into the small pores and openings which make up the surface of the substrate. The support layer preferably comprises a low cost filler material. A wide variety of filler materials may be used in the present invention to form the support layer. The filler material should be selected so that it adheres well to the substrate upon which it is to be coated to quickly seal the porosity of the paper, as will be appreciated by those of skill in the art. Furthermore, the filler material should be capable of being expressed from a dual-die or curtain coating die using the principles outlined below. With these goals in mind, it has been found that suitable filler materials for the present invention may comprise emulsions or water dispersions of latexes, cross-linkable latexes, water soluble polymers like polyvinyl alcohols, carboxymethyl cellulose (CMC), starch, ethylene vinyl acetate (EVA), and may include inorganic compounds and fillers like calcium carbonate. Representative nonlimiting filler materials include emulsions in water dispersions of styrene butadiene latex, styrene butadiene rubber compounds (SBR), mixtures of water and Air Products Airflex 465, and National Starch E-200 and water.

The silicone release surface may be derived from a variety of sources. For example, an emulsion vinyl-addition silicone system may be used, such as that described in Examples 1–6 below. Alternately, an aqueous emulsion blend of a vinyl-addition silicone system which includes at least one secondary or resin component may be used. The secondary component may be a traditional thickening agent to aid in the processing or simultaneous coating of the silicon-release surface, such as glycol, ethylene oxide, starch, urethane associated acrylates, cellulose polyethylene oxide, polyvinyl oxides, as well as other thickening agents known to those of skill in the art. Suitable vinyl-addition silicone systems with secondary components are those described in U.S. Pat. Nos. 5,318,815 or 5,165,976, the entirety of each of which are incorporated herein by reference. Representative silicone release compositions are available, such as General Electric silicones GE 1111-11-259, GE 1192-05-117, GE 1111-13-286, GE 1111-15-307, Corning silicones 7980, 7923, 5602, Wacker silicones 38197 VP, V-20 and Rhodia Silicolease.

Furthermore, release surfaces suitable for use in the present invention may also be formed of compositions devoid of silicone. These release surfaces may be incorporated into the present invention by following the teachings herein. Examples of these non-silicone release surfaces include polyvinyl carbamates, vinyl acetate homopolymers and copolymers, quillion (chromium complexes), nitrocelluloses, caseing, formaldehyde modified starches, cellulose acetate butyrate, polyvinyl chloride resins, fluorocarbon polymers such as vinyl ethers, and waxes, all of which will form suitable release surfaces for a variety of PSA constructions.

EXAMPLES

The release properties of the liners of Examples 1–22 were quantified using two methods, the 90° peel release force and the 180° peel release profile. The 90° peel release force was measured on a TLMI Lab Master instrument in the liner off mode, at a rate of 7.62 m/min, and results were measured in cN/25 mm. The 180° release profile was generated by measuring the peel release force on an Instrumentors ZPE-1000 High Rate Peel Tester at rates of 10, 30, 100, 200, and 300 m/min, in the liner off mode, and results were measured in cN/25 mm. Protocols for performing the tests are as follows:

90% Peel Release Force

This test method allows the end user to determine the force required to separate the release backing form the pressure sensitive adhesive coated face material. The release force is defined as the force required to separate a pressure sensitive adhesive coated material from its release surface (or vice versa) at an angle of 90° and a jaw separation rate of 7.62 m per minute.

A TLMI Lab Master instrument was used. The equipment was fitted with a back plate to which the test strip can be attached in order to maintain an angle of peel of 90° throughout the test. Pressure plates were loaded to give a pressure of 6.86 kPa (70 g/m$^2$) on the test piece. The strips to be tested were 25 mm wide and had a minimum length of 175 mm in the machine direction.

The strips were placed between two flat plates and kept for 20 hours at 23 deg. C.±2 deg. C. under a pressure of 6.86 kPs (70 g/cm$^2$) to ensure good contact between the release surface and the adhesive. After storage in this manner, the strips were removed from between the plates and keep for not less than 4 hours at the standard test conditions of 23±2° C. and 50±5% RH.

Each strip was fixed to a plate by means of double sided tape so that the laminate could be peeled apart at an angle of 90°.

180° High Speed Release Force

This test method allows the label user to assess the separation force of a laminate at speed comparable to those typically used to convert and dispense the material. It therefore provides a good assessment of the conversion characteristics of the laminates being tested.

The release force is defined as the force required to separate the backing from the adhesive coated material, at an angle of 180° and at jaw separation rate of between 10 m and 300 m per minute.

To perform the test, an Instrumentors ZPE-1000 High Rate Peel Tester was used, at rates of 10, 30, 100, 200 and 300 m/min., with results being measured in cN/25 mm. The strips were 25 mm wide and had a minimum length of 30 mm in the machine direction. The strips were free from damage and had clean cut edges.

The strips under test were placed between two flat plates and kept for 20 hours at 23±2° C. under a pressure of 6.87 kPa (70 g/cm$^2$) to ensure good contact between the release paper and the adhesive. After storage in this manner, the strips were taken from between the glass plates and kept for not less than 4 hours at the standard test conditions of 23±2° C. and 50%±5% RH.

Examples 1 and 2

Examples 1 and 2 compare the relative release properties of release surface formed from a coating having 100% silicone solids to a release surface formed from a coating having 40% silicone solids. In each case, the silicone containing layer was coated on a release support layer (RSL), where the RSL comprised a filler material coated on paper.

Example 1 consists of a General Electric silicone release layer coated on synthetic SBR as a RSL support layer, which in turn was coated on AT-70 paper. The top layer was prepared by mixing GE 1111-11-259 (62.7 g), GE 1192-05-117 (3.3 g), and water (34.0 g). Because no solids other than silicone were coated to form the release layer, the release layer of Example 1 is formed from 100% silicone solids. The bottom RSL layer is 33% solid synthetic SBR filler. The coating was applied to AT-70 paper using a dual die at coating speed of 200 m/min, and cured at 160° C. for 4 seconds to produce the finished liner. The coat weight is 1.5 g/m$^2$ silicone on 1.5 g/m$^2$ RSL. This release liner was coated with S-490 pressure-sensitive adhesive (Avery Dennison Corporation) to produce the PSA construction.

Example 2 consists of General Electric silicone mixed with synthetic SBR at a ratio of 40/60 (Si/SBR) as a release layer, coated on synthetic SBR as a RSL, which in turn was coated on AT-70 paper. The top layer was prepared by mixing GE 1111-11-259 (25.08 g), GE 1192-05-117 (1.32 g), synthetic SBR filler (60.0 g), and water (13.6 g). Thus, only 40% of the release layer of Example 2 is silicone. The bottom RSL layer is 33% solid synthetic SBR filler. The coating was applied to AT-70 paper using a dual die at coating speed of 200 m/min, and cured at 160° C. for 4 seconds to produce the finished liner. The coat weight of the top layer is 1.5 g/m$^2$ silicone and 2.25 g/m$^2$ RSL, and the bottom layer is 1.0 g/m$^2$ RSL. This release liner was coated with S-490 pressure-sensitive adhesive to produce a PSA construction.

The following release force data was obtained:

TABLE 1

| Example # | Release layer % Silicone solids | 90° Peel Release Force (cN/25 mm) | Peel Release Profile (results in cN/25 mm) | | | | |
|---|---|---|---|---|---|---|---|
| | | | 10 m/min | 30 m/min | 100 m/min | 200 m/min | 300 m/min |
| 1 | 100 | 35.3 | 25.4 | 22.7 | 22.7 | 22.8 | 22.1 |
| 2 | 40 | 46.8 | 42.8 | 39.6 | 32.7 | 26.8 | 23.4 |

Examples 3–6

Examples 3–6 consist of Wacker silicone as a release layer coated on Air Products Airflex 465 as a RSL, which was coated on either Data-70 or Willamette paper. The top layer was prepared by mixing Wacker 38197 VP (66.0 g), Wacker crosslinker V20 (3.5 g), 10% solution of 3M Fluorad fluorochemical surfactant FC-129 (0.7 g), 1% aqueous Cellosize Hydroxyethyl Cellulose QP-100 MH (7.5 g), and water (22.3 g). The bottom RSL layer was prepared by mixing Air Products Airflex 465 (52.3 g) and water (47.7 g). The coating was applied to Data-70 or Willamette papers using a dual die at a coating speed of 400 m/min, and cured at 170° C. for 3 seconds to produce the finished liners. The coat weight is 1.0 g/m$^2$ silicone on 5.0 g/m$^2$ RSL. These release liners were coated with S-2000 emulsion pressure-sensitive adhesive or S-2045 hot melt adhesives (Avery Dennison Corporation) to produce the PSA constructions of Examples 3–6.

The release properties of these liners were quantified using two methods, the 90° peel release force, and the 180° peel release profile. The 90° peel release force was measured on a TLMI Lab Master instrument, at a rate of 7.62 m/min, and results were measured in cN/25 mm. The release profile was generated by measuring the 180° peel release force on an Instrumentors ZPE-1000 High Rate Peel Tester at rates of 3, 30, 60, 100, and 300 m/min, and results were measured in cN/25 mm. The following data was obtained:

Examples 7–10

Examples 7–10 consist of Wacker silicone coated on a National Starch E-200 as RSL, which in turn was coated on Data-70 or Willamette paper #50 EDP. The top layer was prepared by mixing Wacker 38197 VP (66.0 g), Wacker crosslinker V20 (3.5 g), 10% solution of 3M Fluorad fluorochemical surfactant FC-129 (0.7 g), 1% aqueous Cellosize Hydroxyethyl Cellulose QP-100 MH (7.5 g), and water (22.3 g). The bottom RSL layer was prepared by mixing National Starch E-200 (54.5 g) and water (45.5 g). The coatings were applied to Data-70 or Willamette papers using a dual die at a coating speed of 400 m/min, and cured at 170° C. for 3 seconds to produce the finished liners. The coat weight is 1.0 g/m$^2$ silicone on 6.0 g/m$^2$ RSL. This release liners were coated with S-2000 emulsion pressure-sensitive adhesive or S-2045 hot melt adhesive to produce the PSA constructions of Examples 7–10.

The release properties of these liners were quantified using the same method as described above, and the following data was obtained:

TABLE 2

| | Paper | Adhesive | 90° Peel Release Force (cN/25 mm) | Release Profile (velocity in m/min) (results in cN/25 mm) | | | | |
|---|---|---|---|---|---|---|---|---|
| | | | | 3 m/min | 30 m/min | 60 m/min | 100 m/min | 300 m/min |
| Ex. 3 | Data-70 | S-2000 | 41.2 | 10.7 | 26.4 | 36.6 | 39.4 | 35.0 |
| Ex. 4 | Data-70 | S-2045 | 40.9 | 13.2 | 24.5 | 30.4 | 44.5 | 43.4 |
| Ex. 5 | Willamette | S-2000 | 35.3 | 9.5 | 24.4 | 30.2 | 36.2 | 36.2 |
| Ex. 6 | Willamette | S-2045 | 40.5 | 11.2 | 31.6 | 39.2 | 46.2 | 55.1 |

TABLE 3

| | Paper | Adhesive | 90° Peel Release Force (cN/25 mm) | Release Profile (results in cN/25 mm) | | | | |
|---|---|---|---|---|---|---|---|---|
| | | | | 3 m/min | 30 m/min | 60 m/min | 100 m/min | 300 m/min |
| Ex. 7 | Data-70 | S-2000 | 32.3 | 12.7 | 37.1 | 41.9 | 46.5 | 55.2 |
| Ex. 8 | Data-70 | S-2045 | 31.6 | 11.9 | 25.0 | 26.6 | 35.3 | 46.7 |
| Ex. 9 | Willamette | S-2000 | 34.6 | 8.5 | 21.5 | 28.4 | 36.1 | 38.7 |
| Ex. 10 | Willamette | S-2045 | 31.2 | 11.4 | 27.6 | 36.4 | 42.9 | 51.9 |

Examples 11–14

Examples 11–14 consist of General Electric silicone coated on Air Products Airflex 465 as RSL, which in turn was coated on Data-70 or Willamette papers. The top layer was prepared by mixing GE 1111-13-286 (34.7 g), GE 1111-15-307 (34.75 g), 10% solution of 3M Fluorad fluorochemical surfactant FC-129 (0.75 g), 1% aqueous Cellosize Hydroxyethyl Cellulose QP-100 MH (8.9 g), and water (20.85 g). The bottom RSL layer was prepared by mixing Air Products Airflex 465 (52.3 g) and water (47.7 g). The coating was applied to Data-70 or Willamette papers using a dual die at a coating speed of 400 m/min, and cured at 170° C. for 3 seconds to produce the finished liner. The coat weight is 1.0 g/m² silicone on 5.0 g/m² RSL. This release liner was coated with S-2000 emulsion pressure-sensitive adhesive or S-2045 hot melt adhesive to produce the PSA constructions of Examples 11–14.

The release properties of these liners were quantified using the same method as described above, and the following data was obtained:

TABLE 4

| | Paper | Adhesive | 90° Peel Release Force (cN/25 mm) | Release Profile (results in cN/25 mm) | | | | |
|---|---|---|---|---|---|---|---|---|
| | | | | 3 m/min | 30 m/min | 60 m/min | 100 m/min | 300 m/min |
| Ex. 11 | Data-70 | S-2000 | 24.9 | 22.5 | 24.8 | 28.9 | 33.8 | 22.4 |
| Ex. 12 | Data-70 | S-2045 | 28.8 | 25.2 | 18.9 | 23.2 | 19.8 | 18.1 |
| Ex. 13 | Willamette | S-2000 | 21.1 | 11.8 | 14.0 | 14.3 | 17.9 | 24.1 |
| Ex. 14 | Willamette | S-2045 | 22.5 | 23.7 | 19.1 | 21.3 | 23.6 | 27.7 |

Example 15

Example 15 consists of Dow Corning silicone coated on Air Products Airflex 465 as RSL, which in turn was coated on Data-70 paper. The top layer was prepared by mixing Dow Corning 7980 (44.0 g), Dow Corning 7923 (11.0 g), Dow Corning 5602 (1.0 g), and water (44.0 g). The bottom layer was prepared by mixing Air Products Airflex 465 (52.3 g) and water (47.7 g). The coating was applied to Data-70 paper using a dual die at a coating speed of 400 m/min, and cured at 170° C. for 3 seconds to produce the finished liner. The coat weight is 1.0 g/m² silicone on 5.0 g/m² RSL. This release liner was coated with S-2000 emulsion pressure-sensitive adhesive to produce the PSA construction.

The release properties of the liner were quantified using the same method as described in example 1, and the following data was obtained.

TABLE 5

| | Paper | Adhesive | 90° Peel Release Force (cN/25 mm) | Release Profile (results in cN/25 mm) | | | | |
|---|---|---|---|---|---|---|---|---|
| | | | | 3 m/min | 30 m/min | 60 m/min | 100 m/min | 300 m/min |
| Ex. 15 | Data-70 | S-2000 | 24.8 | 10.8 | 22.3 | 33.1 | 35.9 | 31.0 |

Examples 16–19

Four different silicone formulations were used to find the lowest possible silicone coat weight which still provides acceptable release properties for the PSAs tested.

Example 16 consists of 6.7% solid General Electric silicone coated on National Starch E-200 as RSL coated on Data-70 paper. The top layer was prepared by mixing GE 1111-11-259 (12.65 g), GE 1192-05-117 (0.67 g), 10% solution of 3M Fluorad fluorochemical surfactant FC-129 (0.13 g), 1% aqueous Cellosize Hydroxyethyl Cellulose QP-100 MH (30.44 g), and water (56.11 g). The bottom RSL layer was prepared by mixing National Starch E-200 (54.5 g) and water (45.5 g). The coating was applied to Data-70 paper using a dual die at a coating speed of 6.62 m/min, and cured at 155° C. for 60 seconds to produce the finished liner. This formulation was used to produce dry coat weights with 0.2 g/m$^2$ silicone on 6.0 g/m$^2$ of E-200 support layer. The release liner was laminated with S-490 pressure-sensitive adhesive to produce a PSA construction. Samples were then Keil aged at 70° C. for 20 hours for release testing. In Keil aging, samples are aged between aluminum metal plates for 20 hours at a pressure of 6.9 KPa. This is conveniently accomplished by placing a weight upon the plates when the sample is in the oven. The samples were then equilibrated at 23° C. and 50% relative humidity for 24 hours.

Example 17 consists of 10% solid General Electric silicone coated on National Starch E-200 RSL coated on Data-70 paper. The top layer was prepared by mixing GE 1111-11-259 (18.96 g), GE 1192-05-117 (1.0 g), 10% solution of 3M Fluorad fluorochemical surfactant FC-129 (0.2 g), 1% aqueous Cellosize Hydroxyethyl Cellulose QP-100 MH (28.51 g), and water (51.33 g). The bottom RSL layer was prepared by mixing National Starch E-200 (54.5 g) and water (45.5 g). The coating was applied to Data-70 paper using a dual die at a coating speed of 7.62 m/min, and cured at 155° C. for 60 seconds to produce the finished liner. This formulation was used to produce coatings with 0.3 g/m$^2$ silicone on 6.0 g/m$^2$ E-200 as RSL. The release liner was laminated with S-490 pressure-sensitive adhesive to produce a PSA construction. Samples were then Keil aged as described above at 70° C. for 20 hours for release testing, and equilibrated as above.

Example 18 consists of 13.3% solid General Electric silicone coated on National Starch E-200 as RSL coated on Data-70 paper. The top layer was prepared by mixing GE 1111-11-259 (25.27 g), GE 1192-05-117 (1.33 g), 10% solution of 3M Fluorad fluorochemical surfactant FC-129 (0.27 g), 1% aqueous Cellosize Hydroxyethyl Cellulose QP-100 MH (25.65 g), and water (47.48 g). The bottom RSL layer was prepared by mixing National Starch E-200 (54.5 g) and water (45.5 g). The coating was applied to Data-70 paper using a dual die at a coating speed of 7.62 m/min, and cured at 155° C. for 60 seconds to produce the finished liner. This formulation was used to produce a coating with 0.4 g/m$^2$ RSL. This release liner was laminated with S-490 pressure-sensitive adhesive to produce a PSA construction. Samples were then Keil aged as described above at 70° C. for 20 hours for release testing, and equilibrated as above.

Example 19 consists of 16.7% solid General Electric silicone coated on National Starch E-200 RSL coated on Data-70 paper. The top layer was prepared by mixing GE 1111-11-259 (31.56 g), GE 1192-05-117 (1.66 g), 10% solution of 3M Fluorad fluorochemical surfactant FC-129 (0.33 g), 1% aqueous Cellosize Hydroxyethyl Cellulose QP-100 MH (22.55 g), and water (43.90 g). The bottom RSL layer was prepared by mixing National Starch E-200 (54.5 g) and water (45.5 g). The coating was applied to Data-70 paper using a dual die at a coating speed of 7.62 m/min, and cured at 155° C. for 60 seconds to produce the finished liner. This formulation was used to produce a coating with 0.5 g/m$^2$ silicone on 6.0 g/m$^2$ RSL. This release liner was laminated with S-490 pressure-sensitive adhesive to produce a PSA construction. Samples were then Keil aged as described above at 70° C. for 20 hours for release testing, and equilibrated as above.

The release properties of these liners were quantified using the 90° peel release force. The 90° peel release force was measured on a TLMI Lab Master instrument, at a rate of 7.62 m/min, and results were measured in cN/25 mm. The following data was obtained:

TABLE 6

| Example # | Silicone Wt (g/m$^2$) (Theoretical) | 90° Peel Release Force (cN/25 mm) | Oxford Silicone Measurement (g/m$^2$) |
|---|---|---|---|
| 16 | 0.2 | 29.2 | 0.17 |
| 17 | 0.3 | 26.7 | 0.31 |
| 18 | 0.4 | 17.6 | 0.50 |
| 19 | 0.5 | 12.6 | 0.55 |

Examples 20–22

Example 20 consists of a General Electric silicone coated on Air Products Airflex 426 coated on Georgia Pacific vellumina paper. The top layer was prepared by mixing GE 1111-13-286 (34.75 g), GE 1111-15-307 (34.75 g), 10% solution of 3M Fluorad fluorochemical surfactant FC-129 (0.75 g), 1% aqueous Cellosize Hydroxyethyl Cellulose QP-100 MH (8.9 g), and water (20.85 g). The bottom RSL layer was prepared by mixing Air Products Airflex 426 (54 g) and water (46 g). The coating was applied to Georgia Pacific vellumina paper using a dual die at a coating speed of 91.4 m/min, and cured at 165° C. for 3 seconds to produce the finished liner. The dry coat weight is 1.4 g/m$^2$ silicone on 5.0 g/m$^2$ RSL. This release liner was coated with S-2000 emulsion pressure-sensitive adhesive to produce a PSA construction.

Example 21 consists of a General Electric silicone, with 20% CRA, coated on Air Products Airflex 426 coated on Georgia Pacific vellumina paper. The top layer was prepared by mixing GE 1111-13-286 (29.6 g), GE 1111-15-307 (29.6 g), GE 1111-16-332 (14.8 g), 10% solution of 3M Fluorad fluorochemical surfactant FC-129 (0.63 g), 1% aqueous Cellosize Hydroxyethyl Cellulose QP-100 MH (4.65 g), and water (20.72 g). The bottom RSL layer was prepared by mixing Air Products Airflex 426 (54.0 g) and water (46.0 g). The coating was applied to Georgia Pacific vellumina paper using a dual die at a coating speed of 91.4 m/min, and cured at 165° C. for 3 seconds to produce the finished liner. The coat weight is 1.4 g/m$^2$ silicone on 5.0 g/m$^2$ RSL. This release liner was coated with S-2000 emulsion pressure-sensitive adhesive to produce a PSA construction.

Example 22 consists of General Electric silicone, with 30% CRA, coated on Air Products Airflex 426 coated on Georgia Pacific vellumina paper. The top layer was prepared by mixing GE 1111-13-286 (26.63 g), GE 1111-15-307 (26.63 g), GE 1111-16-332 (22.83 g), 10% solution of 3M Fluorad fluorochemical surfactant FC-129 (0.69 g), 1% aqueous Cellosize Hydroxyethyl Cellulose QP-100 MH (3.81 g), and water (22.83 g). The bottom RSL layer was prepared by mixing Air Products Airflex 426 (54.0 g) and water (46.0 g). The coating was applied to Georgia Pacific vellumina paper using a dual die at coating speed of 91.4 m/min, and cured at 165° C. for 3 seconds to produce the finished liner. The coat weight is 1.45 g/m$^2$ silicone on 5.0 g/m$^2$ RSL. This release liner was coated with S-2000 emulsion pressure-sensitive adhesive to produce a PSA construction.

The release properties of these liners were quantified using two methods, the 90° peel release force, and the 180° peel release profile. The 90° peel release force was measured on a TLMI Lab Master instrument, at a rate of 7.62 m/min, and results were measured in cN/25 mm. The release profile was generated by measuring the 180° peel release force on an Instrumentors ZPE-1000 High Rate Peel Tester at rates of 3, 30, 60, 100, and 300 m/min, and results were measured in cN/25 mm. The following data was obtained:

TABLE 7

| Example # | % CRA | 90° Peel Release Force (cN/25 mm) | Release Profile (results in cN/25 mm) | | | | |
|---|---|---|---|---|---|---|---|
| | | | 3 m/min | 30 m/min | 60 m/min | 100 m/min | 300 m/min |
| 20 | 0 | 16.4 | 14.2 | 18.9 | 21.4 | 21.9 | 24.5 |
| 21 | 20 | 19.7 | 17.6 | 26.0 | 33.7 | 36.7 | 35.5 |
| 22 | 30 | 25.9 | 25.3 | 32.5 | 38.1 | 35.8 | 36.7 |

Examples 23 and 24 and Comparative Examples 25 and 26

In Examples 23 and 24, Transmission Election Microscopy (TEM) was used to study the morphology of multilayer release liners of the present invention in comparison to prior art release liners.

For Examples 23 and 24, GE silicone emulsion 1111-11-259 and silicone catalyst emulsion 1192-05-117 were combined to form a total solids content of 35%. This silicone containing layer was coated on an release support layer comprising ethylene vinyl acetate support layer, sold as E-200 by National Starch. The total solids content of the release support layer was 30%. The release support layer was coated on Data 70 paper. Example 23 was coated at a coating speed of 7.62 m/min and cured at 154.4° C. for one minute. The coat weigh ratio of silicone to RSL of Example 23 is 2.0 g/m² silicone to 6.0 g/m² release support layer. Example 24 was coated at coating speed of 91.4 m/min, and cured at an oven temperature of 171.1° C. The coat weight ratio for Example 24 is 2.0 g/m² silicone to 5.0 g/m² RSL.

For comparison to prior art release liners, Comparative Examples 25 and 26 were made using the silicone mixtures, E-200 as RSL, and the paper of Examples 23 and 24. To form Comparative Example 25, the E-200 support layer was coated on a Data 70 paper and then was dried at 154.4° C. for one minute. The silicone layer was then coated on the dried E-200 as RSL, and the multilayer construct was cured at 154.4° C. for one minute. The ratio of silicone to E-200 as RSL was 6.0 g/m² to 12.0 g/m², or 1:2. To form Comparative Example 26 was made in the same manner as Comparative Example 25, except that the E-200 as RSL was not dried prior to application of the silicone layer.

TEMs were made of cross-sections of Examples 23 and 24 and Comparative Examples 25 and 26. In each of the TEMs, darker regions indicate the presence of silicone, and lighter regions indicate the presence of the EVA support layer or paper.

Figure 15:
FIG. 15 is TEM (6,700× magnification) of a cross section of a comparative example generated by wet on wet two pass coating of a silicone containing layer on a support layer.

Referring to FIG. 15, there is shown a TEM of Comparative Example 26. As discussed above, Comparative Example 26 was made by coating the liquid E-200 as RSL layer onto E-200 as RSL paper surface, and then without permitting the RSL to dry or cure, thereafter coating the silicone-containing layer onto the RSL. As shown in FIG. 15, considerable undesirable mixing of silicone and the EVA layer resulted from this sequential coating process. The large amount of silicone in the RSL is wasted, as it does not contribute to the release properties of the liner.

Figure 16:
FIGS. 16 and 17 are TEMs (3,700× magnification) of a cross sections of multilayer release surfaces of the present invention.
Figure 17:
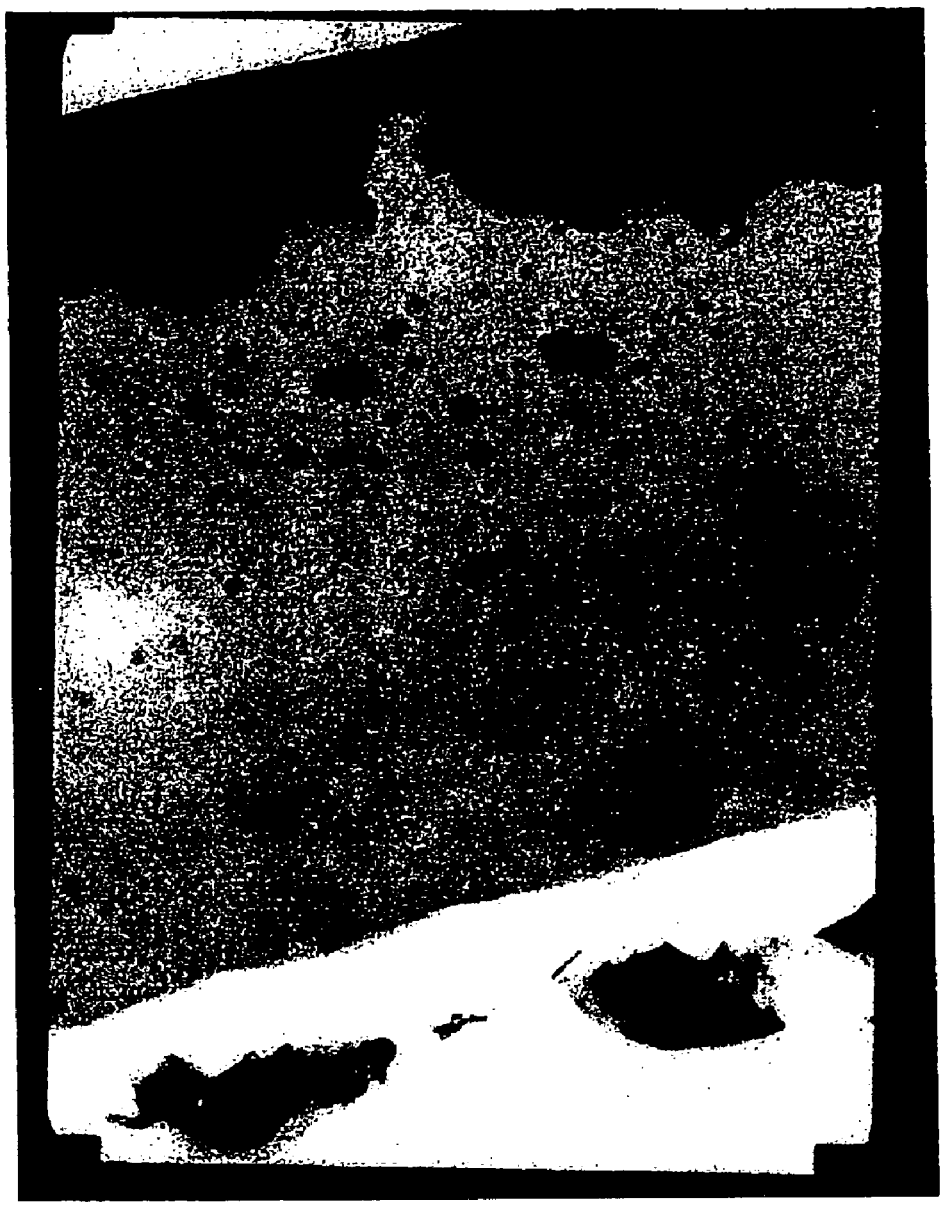

In contrast, the substantially simultaneous coating of two liquid layers using the dual die method of the present invention is observed to create distinct borders between the silicone-containing layer and the RSL. This is observed in FIGS. 16 and 17, which correspond to Examples 23 and 24. As shown in FIGS. 16 and 17, the silicone-containing layer is neatly segregated from the RSL layer, with the irregularity of interfacial layer and small domains of silicone dispersed at various points in the RSL. As noted above, this irregularity of interfacial layer provides for better bonding between the two respective layers, thereby decreasing the propensity for the silicone-containing layer to rub off or separate from the RSL.

Figure 18:
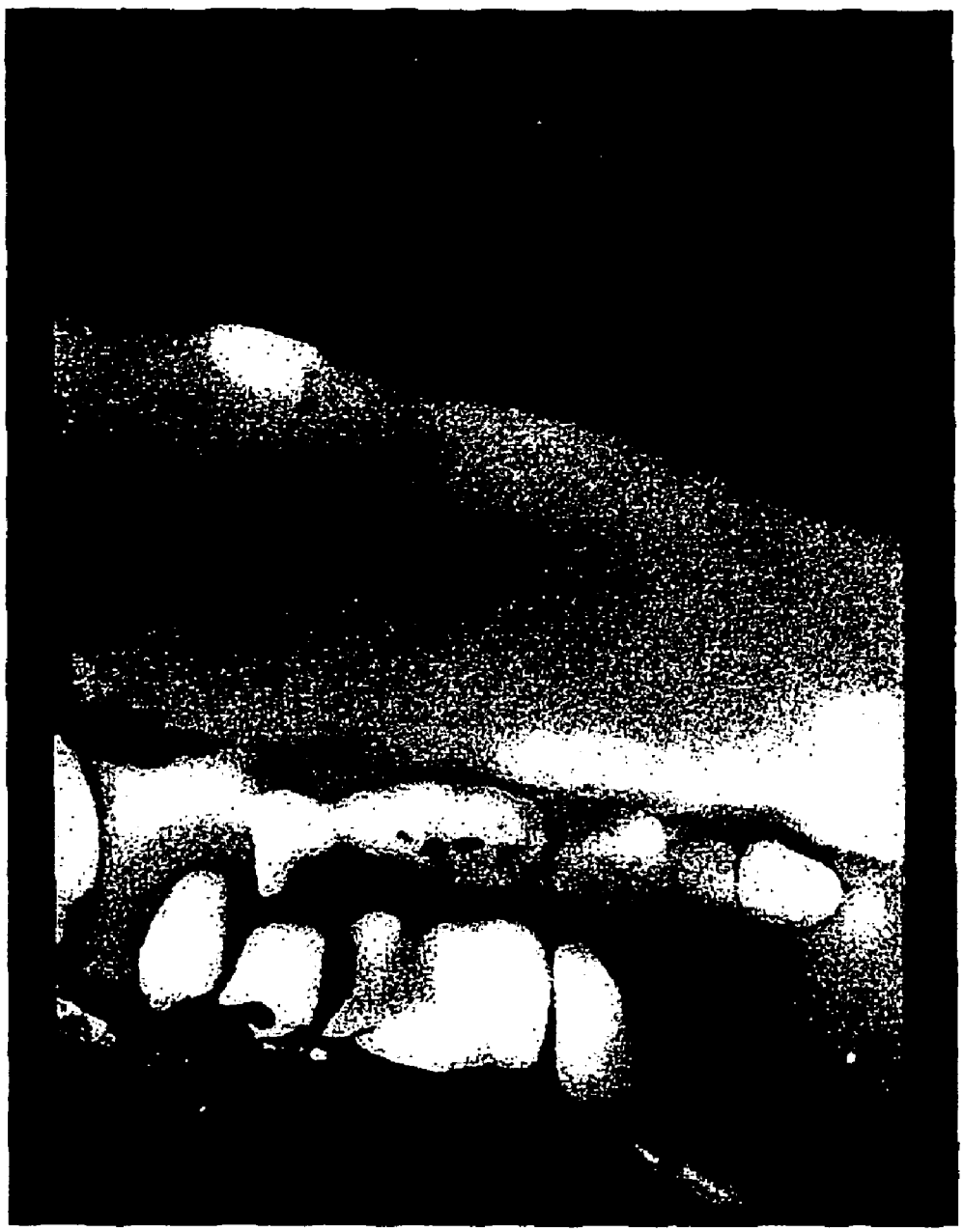
FIG. 18 is a TEM (2,700× magnification) of a cross section of a comparative example generated by coating a silicone layer on a dried support layer.

Referring to FIG. 18, there is shown a TEM of Comparative Example 25. As shown in FIG. 18, a very sharp border exists between the silicone-containing layer and the RSL layer. Little or no intermixing is seen to occur between the two respective layers. Therefore, it is believed that bonding between the respective layers is minimized in comparison to the dual die coating constructs, and therefore the two layers are more likely to separate.

Silicone Dispersion Depth Profiles

For dual die coating, the degree of intermixing between the support layer and the silicone-containing layer is somewhat dependent on the coat weight ratio of silicone to support layer. For dual die applications, it has been found that interlayer mixing decreases as the ratio of silicone/support layer is increased. This is best shown by reference to Table 8 below, which sets forth the total percentage of silicone in the multilayer construct as a function of depth below the upper surface of the silicone-containing layer, as determined from TEM scans. Also shown in Table 8 are Comparative Examples 27 and 28. The Comparative Examples represent the prior art process of first applying the RSL to a substrate, and then curing or drying the RSL before the silicone containing layer is applied. Comparative Examples 27 and 28 were made by coating 6.0 g/m² of GE 1111-13-286/GE 1111-15-307 onto 12.0 g/m² of E-200 as RSL. The RSL was dried prior to silicone application by heating to 154.4° C. for 60 seconds. The paper used for the Comparative Examples was Data 70.

TABLE 8

| Depth Below Surface ($\mu$m) | Silicone/Filler Coatweight Ratio 0.4/6 gsm 2/6 gsm (% total silicone found at this depth) | | 0.5/6 gsm | Wet-On-Dry Comparative Ex. 27 (% total silicone found at this depth) | Wet-On-Dry Comparative Ex. 28 (% total silicone found at this depth) |
|---|---|---|---|---|---|
| <0.5 | 25.8% | 28.3% | 19.1% | 6.0% | 6.20 |
| <1 | 40.3% | 51.7% | 39.5% | 13.0% | 12.7% |
| <2 | 50.7% | 69.5% | 76.9% | 26.4% | 25.5% |
| <3 | 60.9% | 80.6% | 90.9% | 39.9% | 38.5% |
| <4 | 70.6% | 88.0% | 95.7% | 53.5% | 51.5% |
| <5 | 79.9% | 93.7% | 98.4% | 67.2% | 64.8% |
| <6 | 87.7% | 97.6% | 99.6% | 81.0% | 78.1% |
| <7 | 92.6% | 99.6% | 99.9% | 95.0% | 91.3% |

TABLE 8-continued

| Depth Below Surface (μm) | Silicone/Filler Coatweight Ratio 0.4/6 gsm 0.5/6 gsm 2/6 gsm (% total silicone found at this depth) | | | Wet-On-Dry Comparative Ex. 27 (% total silicone found at this depth) | Wet-On-Dry Comparative Ex. 28 (% total silicone found at this depth) |
|---|---|---|---|---|---|
| <8  | 97.5%  | 100.0% | 100.0% | 100% | 97.3%   |
| <9  | 98.9%  | 100.0% | 100.0% | 100% | 9.10%   |
| <10 | 99.4%  | 100.0% | 100.0% | 100% | 100.00% |
| <11 | 99.9%  | 100.0% | 100.0% | 100% | 100.00% |
| <12 | 100.0% | 100.0% | 100.0% | 100% | 100.00% |

Furthermore, the distribution of silicone as a function of depth from the release surface differs in the multilayer constructs of the present invention formed by dual die application in comparison to the comparative prior art constructs formed from the two step coating processes. This is best shown by comparing the difference in the increase in percentage of total silicone contained between adjacent 1 micrometer depths. For Comparative Example 27, 13% of all of the silicone coated on the substrate is within 1 micrometer of the surface, and 26.4% silicone is within 2 micrometers of the surface. The percentage difference between the 1 and 2 micrometer measurements is 13.4% (26.4%–13%). By repeating this process for successive depths of Comparative Example 1, it is observed that an average increase of 13.7%±0.3% occurs between adjacent 1 micrometer depths until the total silicone content exceeds 90%. Essentially, this is a linear distribution profile, as would be expected from the prior art process because silicone forms a very discrete layer on the dried support surface, and little intermixing occurs between the support layer and the silicone layer.

In contrast, constructs of the present invention formed by dual die application show a silicone distribution profile that is non-linear. For example, at 2:6 g/m² silicone to support layer ratio, the increase in total silicone content between successive 1 micrometer depth is as follows:

TABLE 9

| Depth Below Surface | Total Silicone (%) | Difference in %/μm (from 1 μm above) |
|---|---|---|
| 0.5 | 19.1 | |
| 1 | 39.5 | 40.8 (20.4 ÷ 0.5) |
| 2 | 76.9 | 37.4 |
| 3 | 90.9 | 14.0 |
| 4 | 95.7 | 4.8 |
| 5 | 98.4 | 2.7 |
| 6 | 99.6 | 1.2 |
| 7 | 99.9 | 0.3 |
| 8 | 100% | 0.1 |

A greater concentration of silicone is observed a points nearer to the surface of the release layer. In contrast, a relatively constant concentration of silicone was observed in comparative Examples 27 and 28. Furthermore, looking to the 0.4:6.0 and 0.5:6.0 g/m² embodiments, total silicone ranges from 50.7 to 76.9% at a depth of 2 micrometers, and 70.6 to 95.7% to a depth of 4 micrometers, and 79.9 to 98.4% at a depth of 5 micrometers.

Die Coating

The principles of dual die coating to make multilayer constructs are explained below.

In one aspect of the dual die method of the present invention, a uniformly layered film in the cross-web direction is achieved by the careful analysis of the viscosities and other physical parameters of the liquids to be coated onto the web to form a multilayer product. The uniformity results in a high quality product. In addition to this analysis, the present method involves the design of the die lips and their placement relative to the web in accordance with important principles of fluid mechanics, in order to regulate the pressure gradients of flow during operation. Pressure gradient regulation may also be accomplished, in addition to the foregoing, by application of vacuum upstream of the coating bead. These steps of die lip design, die set-up and application of vacuum provide the capability to control the separating line of two or more contiguous liquid layers at the stability point and the assurance of steady, two-dimensional flow. In order to ensure successful operation, a coating window (including a quality window) can be determined and an optimal operating point determined.

Referring to FIG. 1, there is illustrated somewhat schematically a typical die coating operation. The die 20 is shown positioned adjacent to a moving substrate or web 22 traveling in the direction of arrow 24. The web 22 travels around a back-up roll 26 as it passes across the distal end of the multilayer die 20. As shown in FIG. 1, it will be understood that both the die 20 and the web 22 have substantially equal widths, such that most of the entire width of the substrate or web is coated in one pass by the fluid flowing out of the die and onto the web.

Figure 2:
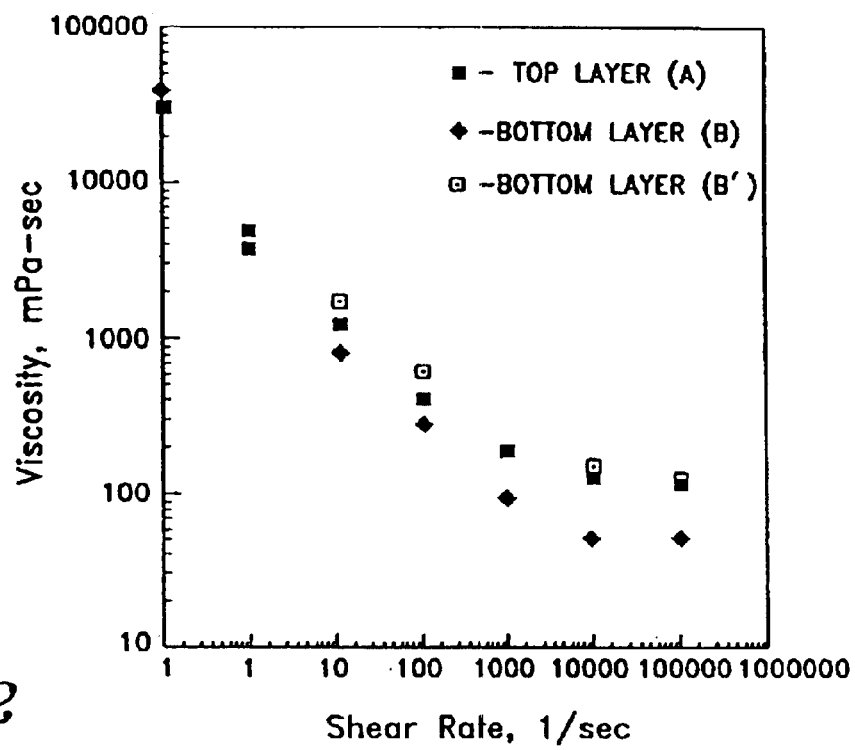
FIG. 2 is a graph of shear rate versus viscosity for three sample liquids to be coated onto a web in accordance with the present method.

The die 20 is modular in that it can be assembled from a number of individual elements and then set in the coater machine as an integral device. Each die element is comprised typically of a manifold 19 and a more distal die section 21. The most distal portion of the die section is referred to as the die lip 29, described and illustrated in more detail in connection with FIG. 2. Since the die 20 is modular, various combinations of die lips 29 can be assembled without necessitating modifications to the other die sections and lips 29.

As illustrated by the horizontal arrow 28 in FIG. 1, the die 20 can be moved radially into or away from the back-up roll 26 in order to adjust the coating gap 30, which is defined as the distance between the die lips 29 and the web 22. In addition, the angle of attack (α) of the die 20 can be adjusted, as shown by the arrow in FIG. 1.

The elements of the die 20 are separated from each other slightly by slots or feed gaps 32 which allow the coating material to flow from a manifold 34 in the die 20, through these feed gaps in the die 20, and onto the moving web 22. In the multilayer die 20 of FIG. 1, two feed gaps 32 are shown. However, as noted above, it will be understood that the principles of the present invention are equally applicable to a plurality of layers in addition to two.

Analysis of Coating Liquids

As noted above, in one important aspect of the present invention, certain physical parameters of the liquids to be coated in multiple layers onto the substrate or web are analyzed with respect to the likelihood of achieving uniform film thicknesses in the cross-web direction. Of these parameters, perhaps the most important is the liquid's viscosity. More specifically, it will be understood that the ratio of viscosities of the two contiguous layers to be coated must be carefully analyzed and, if possible or practical, adjusted to a value within the optimal range.

For example, it has been observed that if the viscosity of the top layer liquid is in the range of 50% less than to 100% more than the viscosity of the bottom layer liquid better coating results are likely, although other ratios may also provide good coating results if other parameters are optimized. Optimally, the viscosity of the top layer should be about 30% greater than that of the bottom layer. Viscosity ratios in this range provide a more stable flow. More specifically, a higher top layer viscosity reduces the risk of cross-web defects termed "inter-layer ribbing", in which the top and bottom layers alternate with one another across the web rather than forming two uniform films, one on top of the other.

It will be understood that the relative viscosities of the liquids to be coated are determined in large part by the nature of the multilayer product to be produced. That is, adjustments to viscosity in one liquid or the other may not be possible or practical depending on cost, supply, delivery or other variables. However, to some degree, the viscosities of the liquids may be "matched" in order to achieve favorable coating conditions. For example, if greater flow stability is desired, it may be possible to increase the viscosity of the top liquid by adding thickeners. Likewise, the viscosity of the bottom layer may be reduced by adding thinners, such as water, solvent, etc. On the other hand, such thinning agents, and especially, solvents, generate other problems such as environmental concerns, increased drying time, etc.

In analyzing viscosities, however, one must consider the shear rates experienced by the particular liquid under typical coating conditions. Such shear rates vary by several orders of magnitude, but typically exceed $1000 \text{ s}^{-1}$ at most locations along the bead. Thus, at these shear rates, the relative viscosity of the liquids can vary widely.

Figure 3:
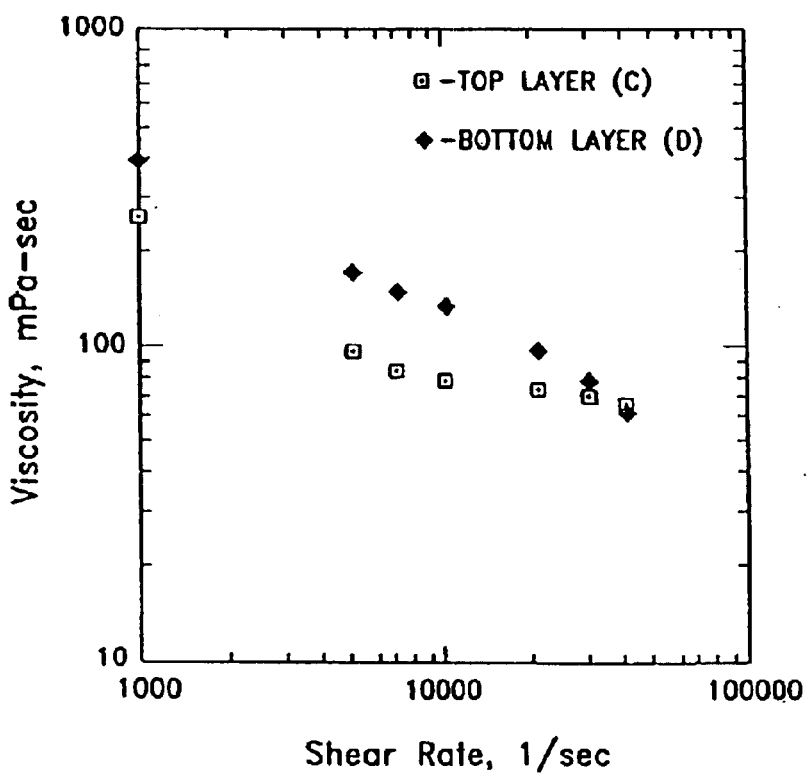
FIG. 3 is a second graph of shear rate versus viscosity for different sample liquids to be coated.

FIG. 3 illustrates a shear rate/viscosity graph in which it is proposed that a top layer A be coated over a second liquid formulated at two different viscosities (B and B'), where B' is greater than B. In this graph, shear rates are displayed over a range from 0.1 to $100,000 \text{ s}^{-1}$; although, the area of analysis is at shear rates above about $1000 \text{ s}^{-1}$. It will be noted that the ratio of viscosities between layer A and layer B changes significantly at higher shear rates as compared to lower shear rates. Furthermore, based on the foregoing analysis, one would assume that the combination of liquid A over liquid B would coat well since the viscosity of A is greater than that of B. Indeed, successful coating was achieved experimentally, but initially only at lower web speeds. At higher web speeds, the bead leaked upstream, a defective condition described in more detail below. The reason this condition occurred in the present example lies in the fluid mechanics of the flow and relates to the difficulty of a lower viscosity liquid (liquid B in this example) to generate enough pressure drop below the upstream lip to seal a bead which downstream is made up, in part, of a more viscous liquid (A). This illustrates the interaction of several principles which need to be considered in this liquid viscosity analysis. For example, this upstream leakage condition can be corrected in several possible ways. One involves the design of the lip geometries in accordance with principles of the present method described in more detail below. Another involves the adjustment of the relative viscosities of the two liquids.

For example, when liquids A/B' were coated experimentally, good coating results were obtained over a wide range of web speeds. This is because, as FIG. 2 graphically illustrates, the viscosities of the two liquids are balanced or better matched at high shear rates. For example, the viscosity of liquid B' is more than twice that of B. It must be noted, however, that the viscosity of B' did not substantially exceed the viscosity of the top layer A.

This condition is illustrated in FIG. 3 which illustrates a shear rate versus viscosity graph for two sample liquids C and D. In this example, liquid C is to be coated on top of liquid D. In this graph, only the high shear rate viscosities need be analyzed. Thus, it will be observed from FIG. 3 that, for most of the typical shear rate range, the viscosity of the bottom layer D exceeds that of the top layer C. Under these inverse viscosity conditions, it has been found that it is difficult to achieve stable coating, and, although multilayer coating may be possible, it is difficult to achieve high quality. Under proper viscosity conditions, the coating window for a particular operation will be larger, thus increasing the likelihood of stable flow.

It will be appreciated, by those of ordinary skill, that a wide variety of viscosity relationships will be encountered in producing a particular multilayer product. Thus, the foregoing examples are not to be considered exhaustive of the scope of the liquid analysis encompassed within the steps of the present method.

Another aspect of liquid analysis involves the relative surface tensions of the liquids to be coated. It has been found that the risk of certain defects such as dewetting or voids, or voids in one particular layer, can be reduced if the surface tension of the top layer is less than that of the bottom layer. Under these conditions, the local surface tension (including the dynamic surface tension in the film forming region) will tend to close such voids. Surface tension can be reduced in the top layer, to some degree, by the use of effective surfactants or other organic soluble liquids (alcohol, ketone, etc.).

Thus, the liquid analysis aspect of the present method is important in achieving favorable coating conditions. The lip design and die set-up aspects of the method will be discussed together below; however, the following information relating to single layer coating will explain how those aspects of the present method assist in achieving stable flow.

Single-Layer Fluid Mechanics

In order to assist in understanding the advantages of the present method, it is important to understand the relationship between the coating gap 30, the downstream wet film thickness, and the liquid pressure gradient. This can best be illustrated and explained with respect to a single-layer coating process.

Figure 4:
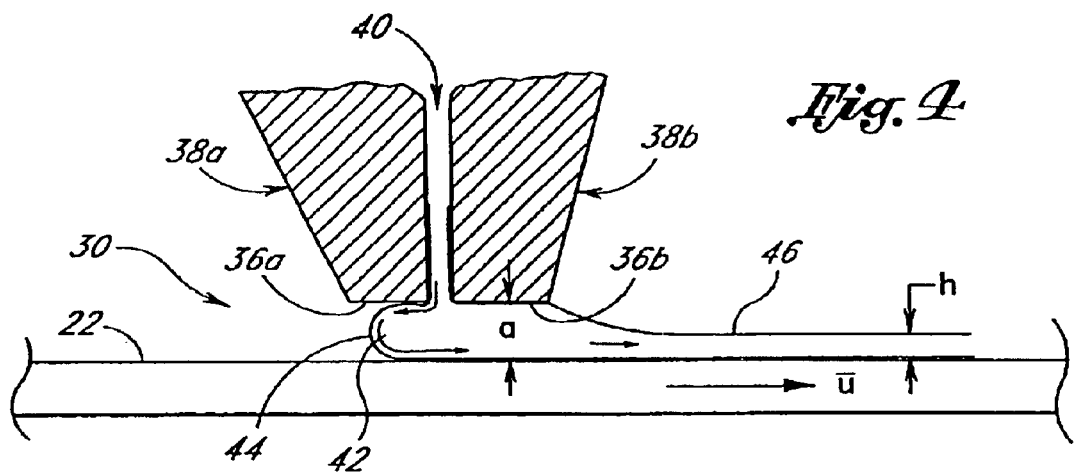
FIG. 4 is a close-up cross-sectional view of a coating gap formed between a single layer die and a moving web illustrating certain principles of fluid mechanics utilized in the present method.

Thus, referring to FIG. 4, there is shown a close-up cross-sectional, schematic view taken through a pair of die lips 36 positioned adjacent to a moving web 22 to form a coating gap 30 ("c.g."). It will be noted with respect to FIG. 1 that the die 20 has been rotated clockwise approximately 90 degrees in order to facilitate this illustration. In addition, the web 22 is shown to be flat or horizontal, whereas it actually will exhibit some curvature as it conforms to the back-up roll (not shown). However, the configuration shown in FIG. 4 is a good approximation of the fluid mechanics occurring in the bead 42 of liquid formed in the coating gap 30 between the die lips 36 and the moving web 22.

For ease of reference, "downstream" will refer to the direction of web 22 travel, while "upstream" is in the opposite direction or to the left. Thus, the upstream lip 36a is formed on the distal-most tip of the upstream die section 38a, while the downstream lip 36b is formed on the distal-most tip of the downstream die section 38b. The two die sections 38a,b form between them a coating slot or feed gap 40 out of which the liquid flows onto the moving web 22. As shown in FIG. 4, the liquid first travels upstream and then turns to flow downstream in an open recirculation within the bead 42. The bead 42 is bounded on its upstream edge by an upstream meniscus 44 and on its downstream edge by a downstream meniscus 46 or film-forming region. If the fluid, due to extreme conditions, escapes the bead 42 and travels upstream, this is referred to as upstream leakage.

The coating gap 30 is shown as dimension A in FIG. 4. It will be understood, particularly with reference to subsequent drawings, that the coating gap 30 can vary along the longitudinal length of the lips 36 in accordance with different lip geometries, lip machining defects, angled or beveled lips, adjustments and angle of attack of the die, etc.

The wet film thickness (h) of the flow is shown downstream of the bead 42. It is defined as the thickness of the flow before drying. The pressure gradient of the flow at various longitudinal positions is related to the wet film thickness (f.t.) and to the coating gap 30 at that location, it being understood that for a given flow rate (Q) the film thickness and web velocity are inversely proportional. Thus, for a Newtonian liquid flowing at steady state, the velocity is given as follows:

$$u = \frac{\overline{u}y}{a} + \frac{a^2}{2\mu}\left(\frac{dp}{dx}\right)\left[\left(\frac{y}{a}\right) - \left(\frac{y}{a}\right)^2\right]$$

where:
- u=velocity of the liquid downstream;
- =velocity of the web;
- a=coating gap (c.g.);
- h=wet film thickness (f.t.);
- $\mu$=viscosity of the liquid;
- x=horizontal coordinate in the downstream direction;
- y=vertical coordinate going from lip to web; and
- dp/dx=pressure gradient in the downstream direction.

It will be noted from this equation that the velocity of the flow (u) is made up of two components. The first component may be characterized as a "drag driven" component, wherein the velocity of flow varies in direct proportion to the speed of the web. The second component may be referred to as a "pressure driven" component, such that the velocity of flow is proportional to the pressure gradient (dp/dx) at a given point. Using the definition of flow rate (Q), one integrate the above equation to solve for the pressure gradient, yielding:

$$\frac{dp}{dx} = \frac{12\mu}{a^3}\left(\frac{\overline{u}a}{2} - Q\right)$$

Since, the pressure gradient may be expressed in terms of the coating gap (a) and wet film thickness (h) as:

$$\frac{dp}{dx} = \frac{12\mu\overline{u}}{a^3}\left(\frac{a}{2} - h\right)$$

Thus, where h=½a (or, in other words, the coating gap is twice the wet film thickness), dp/dx=0. Accordingly, in accordance with these well-known relationships, the velocity of the flow and the related pressure gradient at a particular point in the bead can be determined for a given coating gap/film thickness relationship. The velocity can be plotted as a velocity profile, such as those illustrated in the series of schematic illustrations comprising FIG. 5. In all cases described below, it will be noted that where y=0 (at the die lip), the velocity of flow (u) equals zero; but while y=a (at the web), the velocity of flow equals that of the web.

Figure 5A:
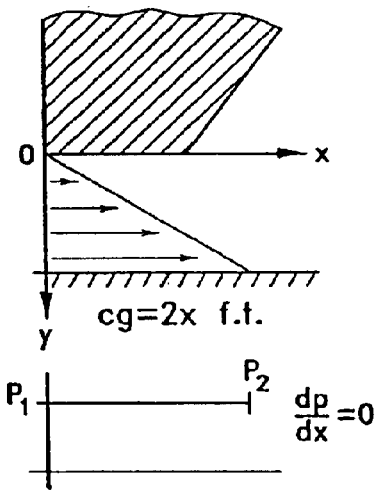
FIGS. 5a–5d are schematic illustrations of the velocity profiles formed within the coating gap illustrated in FIG. 4 under certain coating conditions.

FIG. 5a illustrates a coating condition wherein the coating gap 30 is exactly equal to twice the film thickness. In this condition the pressure in the liquid is constant, giving a pressure gradient of zero.

Figure 5B:
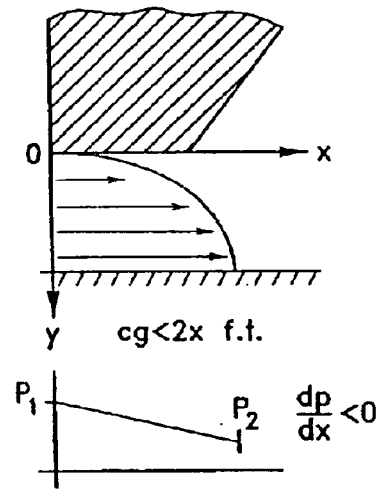

However, as noted above, coating gap conditions can change due to a number of variables. Thus, FIG. 5b illustrates a condition where the coating gap 30 is less than two times the downstream film thickness. Under these circumstances the velocity profile is concave in the downstream direction, thus exhibiting a negative pressure gradient. This negative pressure gradient produces a pressure drop along the downstream lip 36b in the downstream direction. The pressures in the upstream regions are higher, thus adding to the velocity characteristics of the liquid and causing it to push forward or bulge the velocity profile, as shown in FIG. 5b.

Figure 5C:
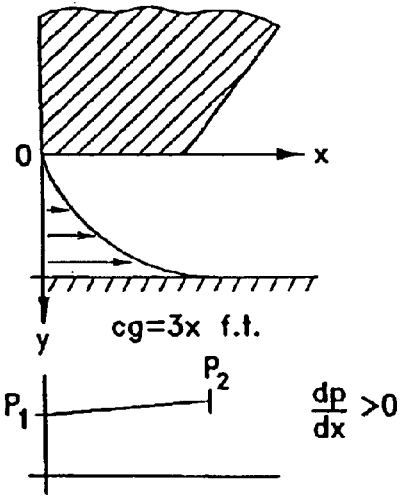

On the other hand, FIG. 5c illustrates the situation where the coating gap 30 is equal to three times the film thickness (h). Under these conditions the downstream pressure gradient is greater than zero, meaning that the flow sees an increasing pressure downstream. This increase in pressure has a tendency to diminish the velocity, making the velocity profile convex in the downstream direction.

Figure 5D:
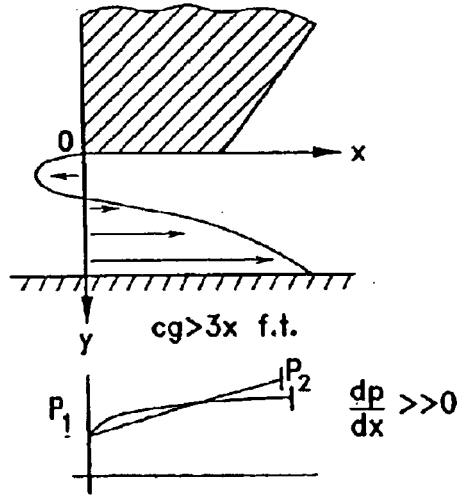

Finally, FIG. 5d illustrates the condition when the coating gap 30 is greater than three times the film thickness (h). Again, the pressure gradient is positive, but more so than that shown in FIG. 5c. Thus, an even greater downstream pressure is seen, actually causing the flow to travel upstream a short distance before it turns and travels downstream. This condition illustrates the principal cause for recirculation in the liquid. This recirculation can occur under the upstream lip 36a, as shown in FIG. 4, but may also occur under the downstream lip 36b if the coating gap 30 is too great, as illustrated in FIG. 5d.

This recirculation, while not particularly damaging to the quality of the film in single layer coating, can have disastrous effects in multilayer coating. It has been found that such conditions can be substantially avoided with correct lip design and proper die assembly and set-up. Because of their interrelationship, these aspects of the present method are discussed together below.

Lip Design and Die Set-Up

The method of the present invention controls the pressure gradients in the liquids under a wide variety of coating conditions in order to achieve a stable flow. This is accomplished in large part by the design of the lip geometries and the assembly, set-up, and adjustment of the die.

Figure 6:
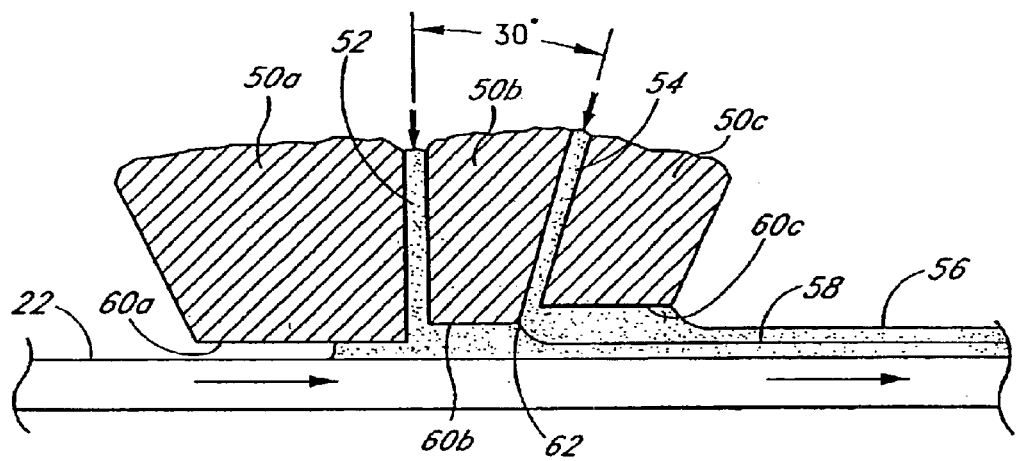
FIG. 6 is a close-up cross-sectional view of the coating gap of the multilayer die shown in FIG. 1, further illustrating the adjustment of the various coating parameters in accordance with the method of the present invention.

Thus, referring to FIG. 6, there is shown a close-up cross-sectional view of a multilayer die 20 which may be utilized with the method of the present invention. The present method can be utilized in accordance with dies and other coating techniques well known to those of ordinary skill in the art to produce successful multilayer products.

Although similar to FIG. 4, this die 20 is comprised of upstream and downstream die sections 50a and 50c, as well as a middle section 50b separating the two. Formed between these various sections are an upstream feed gap 52 and a downstream feed gap 54. The liquid from the upstream feed gap 52 flows onto the web 22 to form a bottom layer 58, while the liquid from the downstream feed gap 54 flows onto the bottom layer to form a top layer 56. It will be noted that the angle formed between these two feed gaps 52, 54 is approximately 30 degrees, which advantageously provides a good construction for the machining of a middle lip 60b formed on the distal end of the middle land 50b. It will also be noted from FIG. 6 that the lips 60a and 60c of the upstream and downstream die sections 50a,c form a stepped or staircase configuration with respect to the middle lip 60b in order to regulate the pressure gradient in this region. The importance of this relationship will be described and illustrated in more detail in connection with FIG. 5.

It will be noted in FIG. 6 that this stepped lip configuration results in various coating gaps. For ease of reference, the subscript b will refer to the bottom layer 58 while the subscript t will refer to the top layer 56. Thus, the coating gap of the bottom layer (c.g.$_b$) is characterized by two different values, one under the upstream lip 60a and one under the middle lip 60b. The coating gap of the top layer (c.g.$_t$) is characterized by a larger value. As noted above, these coating gaps bear important relationships to the downstream film thickness of the respective flows which are formed thereby. Thus, for example, the bottom coating gap bears an important relationship in terms of pressure gradient with the downstream film thickness of the bottom layer 58 (f.t.$_b$), while the coating gap of the top layer 56 bears an important relationship with the total downstream film thickness (f.t.$_t$) (it is perhaps helpful to note that the subscript t may refer not only to the top layer, but also to the "total" thickness of the downstream film) which includes the sum of the bottom and top layers. This is because the coating gap analysis, in determining pressure gradient, must be based on the total flow at that gap, including the flow approaching the web 22 at that position as well as all previous flows and layers resulting therefrom.

It will be further noted from FIG. 6 that the bottom coating gap is less than the top coating gap in order to form the "step" described above. It should be appreciated, however, in those embodiments where it is desired to eliminate or minimize the step, the differential observed in FIG. 6 will be less noticeable or be nonexistent. This step in the middle lip 60b with respect to the downstream lip 60c occurs in a very important interface area where the two flows converge at the downstream feed gap 54. Thus, an important aspect of the present invention is a design process which results in particular middle lip 60b and downstream lip 60c geometries, including the length of each lip in this region. These are also described in more detail below in connection with FIG. 7.

Finally, it will be noted in FIG. 6 that the lips 60 are each parallel to each other or, in other words, lie in parallel planes. However, the principles of the present invention are not limited to such design considerations. For example, the lips 60 can be angled or beveled with respect to one another, as described below and illustrated in more detail in connection with FIG. 7. In addition, a wide variety of other lip geometries and other methods for affecting the pressure gradient are within the principles of the present invention.

Figure 7:
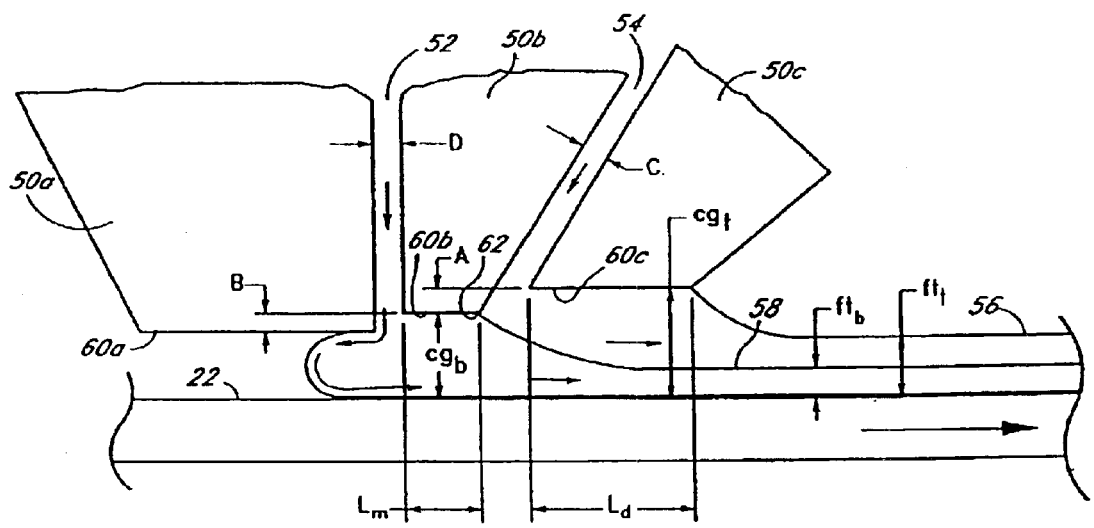
FIG. 7 is a close-up cross-sectional view of the interface region of the coating gap shown in FIG. 6 illustrating in more detail the relationship between lip geometries and the coating gap adjustment steps of the present method.

Referring to FIG. 7, there is shown a close-up view of the interface region, as illustrated more generally in FIG. 4. This drawing illustrates the complete interface between the top layer flow 56 from the bottom layer flow 58. The flow of each layer, as well as its respective direction, is shown by a series of arrows. Thus, the two layers are shown exhibiting steady, two-dimensional flow with the separating streamline optimally positioned at the stability point. This results in uniform layers in terms of cross web and down web cross-sectional thickness. This type of stable, two-dimensional flow results in good multilayer product performance.

As noted above, in order to achieve such stable flow, it is important to avoid mixing between the two layers. This can be achieved, in one aspect of the present invention, by accurate control of the separating line of the two fluids. As shown in FIG. 7, best coating results are achieved when this separating line coincides with the downstream corner 62 of the middle lip 60b, referred to as the stability point. The present invention comprises a method for regulating pressure gradients in the flow to fix or lock the separating line of the top flow at this stability point 62. Preferably, the pressure gradient under the middle lip 60b (and in particular the downstream corner 62 of the middle lip 60b) is not greater than the pressure gradient which would cause recirculation under the middle lip. Thus, the flow of the top layer does not have a tendency to invade the bottom layer coating gap in the upstream direction. This pressure situation tends to fix the separating line at the stability point 62 under the downstream lip.

As noted above, this advantage is achieved in one aspect of the present invention by stepping the die lips away from the web 22 in the downstream direction. This step is shown as dimension A in FIG. 7. The magnitude of this step may fall within a wide range of dimensions which may be optimized for a given set of coating conditions. However, preferably, this distance A will fall in the range of 0–100 micrometers, more preferably 0–30 micrometers, optimally approaching zero when coating multilayer release systems.

Figure 8:
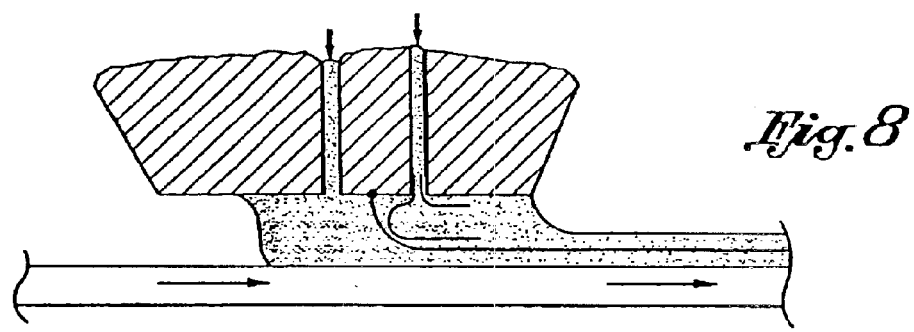
FIG. 8 is a schematic illustration of the recirculation that may occur in the bottom layer liquid if the steps of the present method are not followed.

At the same time, however, as noted above, in order to achieve the advantages of the present invention, these lips must be appropriately positioned with respect to the web 22 in order to achieve the proper coating gaps. For example, if the bottom coating gap (c.g.$_b$) is greater than three times the film thickness (f.t.$_b$), a large pressure gradient will be developed just upstream of the interface area, as illustrated in FIG. 5d. Thus, a negative velocity profile may occur, causing recirculation in the bottom layer under the middle lip 60b. This recirculation may have the effect of pulling the top layer upstream and away from the stability point 62. This condition is illustrated in FIG. 8, and has all the disadvantages described above. On the other hand, if the bottom coating gap is a substantial amount less than two times the film thickness (f.t.$_b$), although the desirable negative pressure gradient will be generated, it may be too high, thus resulting in upstream leakage, high shear rates, etc. Thus, preferably, the bottom coating gap should be maintained at approximately two to three times the film thickness.

Figure 9:
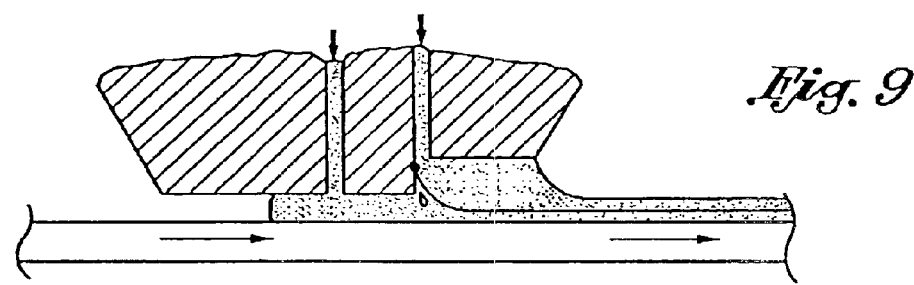
FIG. 9 is a schematic illustration of a vortex that may be formed in the bottom layer liquid if the steps of the present method are not followed.
Figure 10:
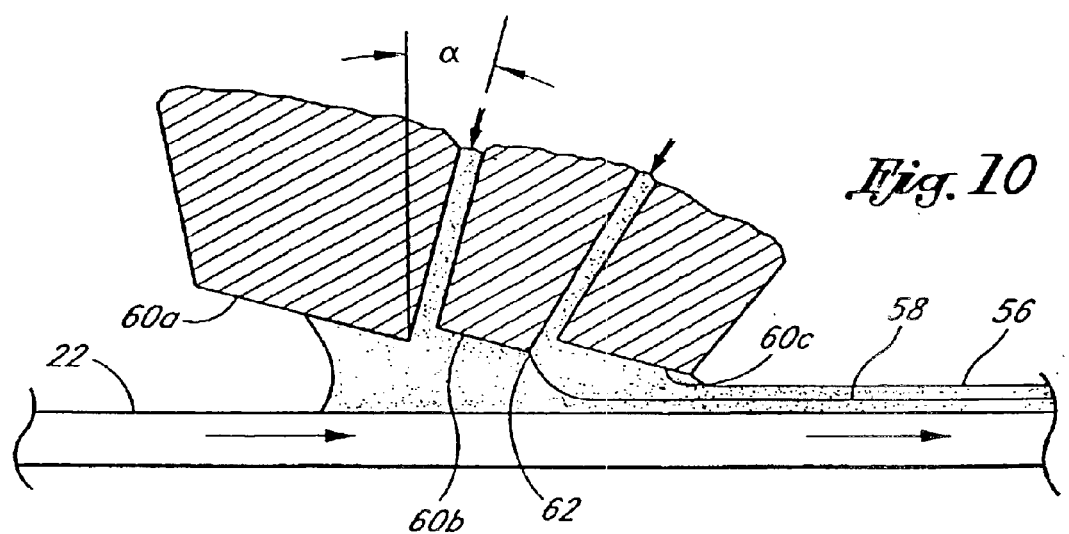
FIG. 10 is a close-up cross-sectional view of the multi-layer die of FIG. 7, illustrating the step of adjusting the die with a negative angle of attack with respect to the web.

In addition, the coating gap under the downstream lip 60c (c.g.$_t$) should be in the range of one to three times the total film thickness (f.t.$_t$). Again, if it is too great, the pressure gradient under the downstream lip may be sufficiently large to cause the separating line to move up into the downstream feed gap and to separate from the middle die at a point on the upstream wall of such feed gap, as illustrated in FIG. 9. This flow condition causes a closed recirculation in the bottom layer flow and results in film defects. Thus, there are a number of trade-offs which require careful balancing of these parameters in order to achieve accurate pressure gradient control.

Referring again to FIG. 7, it will be noted that the upstream lip 60a is also stepped toward the web 22 with respect to the middle lip 60b. This also has the result of decreasing the coating gap and increasing the pressure gradient upstream. This situation will assist in sealing the bead 42 under the die lips. In fact, this coating gap is dictated by the following rationales. The pressure drop developed along this region must match the pressure drop through the liquid along the downstream portion of the flow, plus any differential pressure imposed by the ambient air surrounding the liquid at its downstream and at its upstream interfaces. Thus, the coating gap under the upstream lip 60a can be used to balance these pressure forces. It has been found that a slight step (illustrated as dimension B in FIG. 7) on the order of 0–100 microns is suitable.

Figure 13:
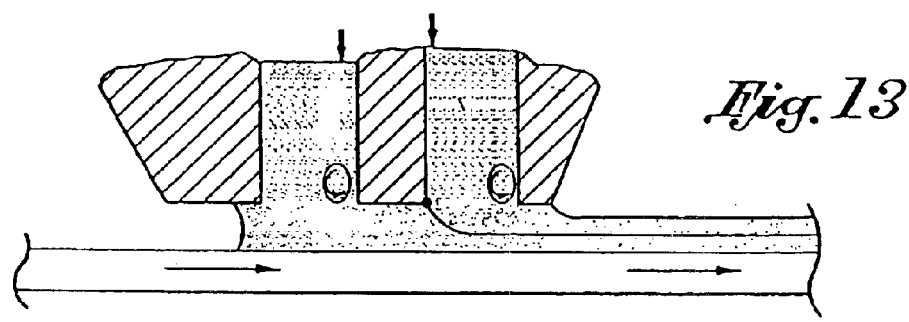
FIG. 13 is a schematic view of the recirculations that may occur in the feed gaps if they are not properly sized in accordance with the present method.

Moreover, because of the sensitivity of this process, it will be appreciated that the total step between the upstream lip 60a and the downstream lip 60c (i.e., A+B) should also be carefully regulated. Thus, it has been found that total steps in the range of 0–0.008 inches are advantageous. In addition, the feed gap dimension should also be carefully maintained to be about not more than five times the wet film thickness of the film being fed through that gap. If this gap is excessive, recirculations can occur in the feed gap, as illustrated in FIG. 13. Thus, these dimensions (C and D in FIG. 7) can each vary in the range of 25–400 microns.

Another important aspect of the present invention which assists in maintaining proper coating gaps and minimizing shear rates is the length of the lips. As shown in FIG. 7, the length of the downstream lip 60c (L$_d$) may be anywhere in the range of 0.1–3.0 millimeters, with about 0.8–1.2 millimeters being preferable. However, the length of this lip should be minimized so as to reduce the shearing of the multilayer film, which could lead to three-dimensional flows and uneven film formation. The length of the middle lip 60b (L$_m$) can also fall within the range of 0.1–3.0 millimeters, with about 0.3–0.7 millimeters being preferable. The length of this lip should be minimized so as to reduce the possibility that the upstream portion, when subject to changes in die angle of attack, will approach a coating gap of three times the film thickness. However, the lip must be long enough to allow the bottom layer flow to develop into a rectilinear flow. Finally, the upstream lip 60a length is less critical, since there is minimal flow along that lip. However, an increased lip length in this region will assist in sealing the flow.

Figure 11:
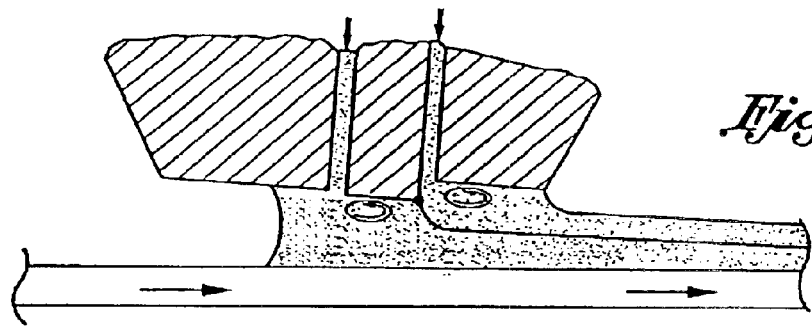
FIG. 11 is a schematic illustration of the recirculations that may occur under the die lips when the angle of attack adjustment shown in FIG. 10 results in excessively large coating gaps at the upstream portions of the lips.
Figure 12:
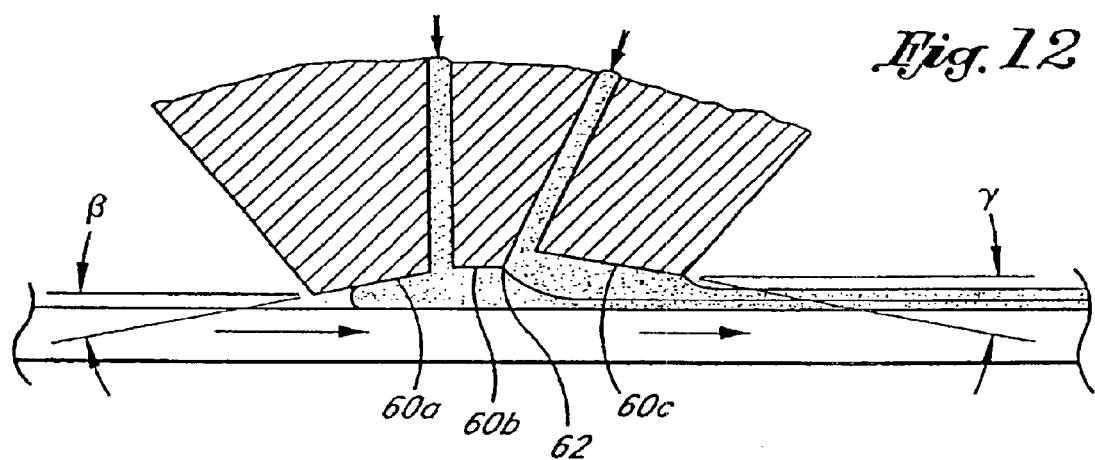
FIG. 12 is a close-up cross-sectional view illustrating the step of the present method of beveling the upstream and downstream lips.

As mentioned, it is well known to place a slight negative angle of attack of the die 20 with respect to the web 22 in order to produce a converging downstream lip 60c. Thus, FIG. 6 illustrates the multilayer die 20 of the present invention turned clockwise at a negative angle of attack (α) with respect to the web 22. Thus, angles of attack in the range of zero to negative 5 degrees have been found to be appropriate for this purpose. It will also be appreciated that this angle of attack changes the coating gap at the upstream edge of all of the lips, thus affecting the performance of the pressure gradient regulator of the present invention. Thus, even if the coating gap at the downstream edges remains the same at its appropriate dimension, depending upon the length of the lips and taking into consideration the curvature of the roll 26, the coating gap at the upstream edges of the lips may exceed the desired value and bring the operation outside the coating window. Thus, the longer the lips and the greater the negative angle of attack, the more likely it is for coating conditions to fall outside the operating window. This situation is illustrated in FIG. 11, which illustrates recirculations under both the middle and downstream lips.

Accordingly, in another aspect of the present invention the upstream and the downstream lips of the die 20 may be beveled in order to minimize these effects. Thus, for example, if the downstream lip 60c is beveled by an angle γ, as shown in FIG. 7, then the need to rotate the die 20 to a negative angle of attack is possibly eliminated. This allows greater control in the coating gap (c.g.$_t$) along this downstream die lip. Likewise, with a convergent beveled downstream lip 60c, the middle lip 60b can be maintained preferably flat, as illustrated. Again, the coating gap under this important middle lip 60b (c.g.$_b$) can be carefully controlled in the absence of angle of attack adjustment. That is, it is much less likely for the coating gap (c.g.$_b$) to exceed three times the film thickness (f.t.$_b$), especially at the upstream edges of the middle lip 60b. However, it should still be noted that the step between the middle and downstream lips, as discussed above in connection with FIG. 7, still exists.

Likewise, certain advantages can be achieved by beveling the upstream lip 60a in a diverging manner by an angle β, as shown in FIG. 7. This divergent angle can be used to seal the bead 42 and adjust pressure drop across the bead. Thus, it has been found that downstream lip 60c bevels in the range of 0–5 degrees are appropriate, while upstream lip 60a bevels in the range of 0–2 degrees are preferable. As noted, these bevels improve the optimization of the coating process, increase the size of the operating window, and reduce the precision which would otherwise be required in coating.

Design Process

In designing the lip geometries for a given set of coating and liquid parameters, any particular sequence of analysis or calculation is possible. One approach is to begin with the downstream lip and move upstream, calculating each coating gap and lip length in the process.

To begin, the wet film thicknesses for the various layers must be determined. Typically, the dry film thickness for each layer is obtained from product specifications in terms of coat weight (such as grams per square meter), and the solid fraction (the percentage of solids in the liquid), the density and viscosity of the liquid formulation to be coated are known. Thus, to arrive at wet film thickness, the coat weight is divided by the product of the solid fraction and the density. This number can then be used, in accordance with the ranges and dimensions set forth above, to compute all coating and feed gaps in the die. The lip lengths and angles of bevel (or angle or attack) may also be computed in accordance with the present method to optimize the coating operation.

Beginning at the downstream edge of the downstream lip, the coating gap may be set at one time the total wet film thickness. At this value, the sufficiently negative pressure gradient in the sense of the web travel should be achieved such that smooth film surface characteristics are achieved. As discussed above, the length of this lip is then designed. Whether the lip is to be beveled or a whether a negative angle of attack is applied to the die, this lip should be convergent in the direction of web travel. With the angle and length of the downstream lip known, the coating gap at the upstream portion of that lip can be calculated so as to ensure that it falls within acceptable ranges.

In designing the downstream lip, some consideration should be given to the issue of angle of attack versus beveling. As noted above, beveling is usually advantageous since it virtually eliminates the negative trade-offs associated with angles of attack. However, beveled lips are more difficult to machine than flat lips; thus, there is some sacrifice in accuracy. There are also increased cost considerations.

Turning to the middle lip, the coating gap at the downstream region is critical, as explained above. It should be maintained at around two to three times the bottom-layer film thickness, and should not be so excessively positive as to cause recirculation under that lip. The length of this lip should be minimized to reduce the likelihood of developing an excessively positive coating gap whenever an angle of attack is applied to the die, but not to the extent that a rectilinear flow cannot develop.

The design of the upstream lip is dictated by pressure drop considerations along the bead. Any design adequate to seal the bead is sufficient. A divergent bevel in the web direction is preferred since the pressure drop varies quadratically with distance along the bead. This means that the position of the upstream meniscus of the bead can be controlled more easily with respect to perturbations.

Once the length and angles of the lips have been determined and desirable coating gaps calculated, the die can be assembled from its various sections. This is accomplished in accordance with well known techniques, using shim stock, etc. At the same time, however, it is important that the steps of the lips relative to one another be correctly positioned. The feed gaps must also be formed by the correct positioning of the die lands. In order to avoid recirculation, the feed gaps should not be excessively wide. Lastly, the die can be set to an initial angle of attack, as determined by the foregoing computations or the development of a coating window, discussed below.

Coating Window

If considered necessary or desirable, ranges of various operating parameters for the die as thus designed and set-up can be determined. This is typically accomplished by experimentally coating the web using various samples of the liquids to be used in production, and by stepping through various angles of attack and coating gaps. Liquids of different viscosities may also be coated. The resulting information can be illustrated with a "coating window" indicating the parameter field within which good coating results are obtained.

Figure 14:
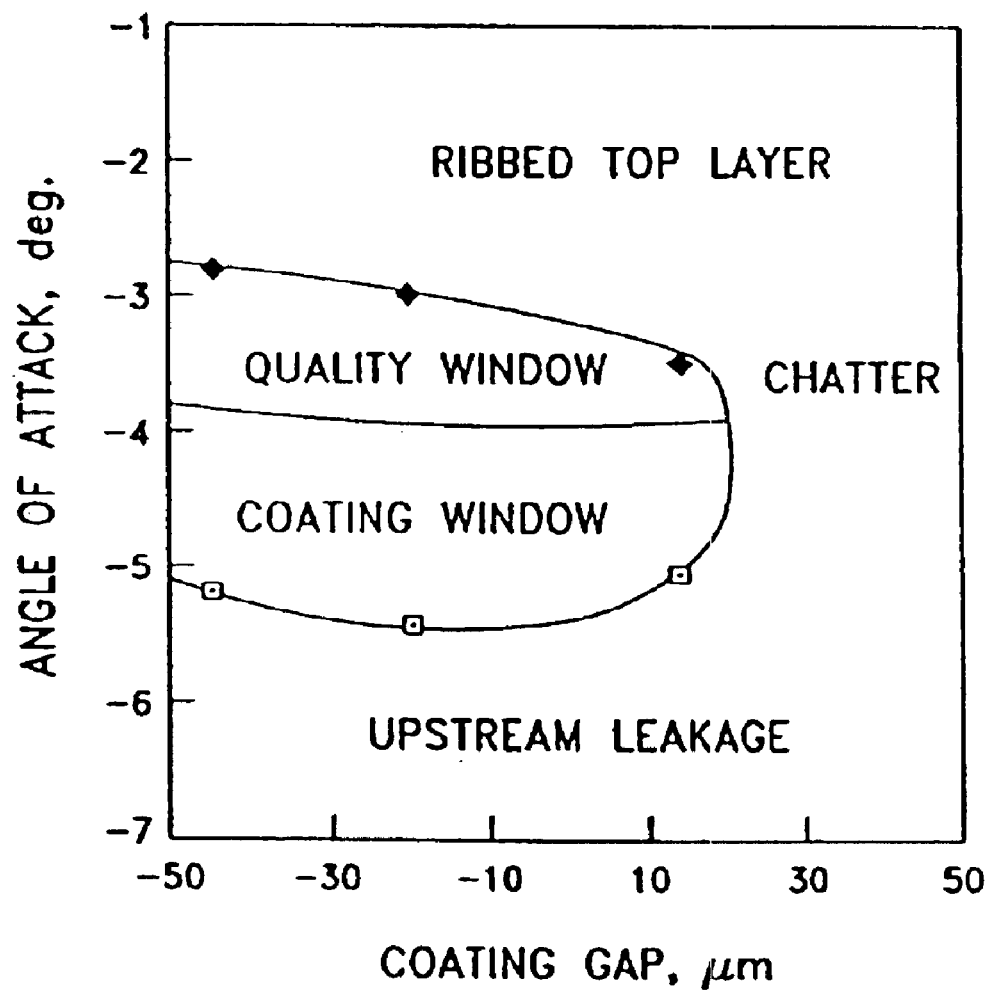
FIG. 14 is a graph of coating gap versus angle of attack illustrating the step of experimentally determining a successful coating window as well as the quality window for a particular set of coating parameters.

FIG. 14 illustrates a typical coating window for a multilayer construction to be coated at a given web speed. As shown, various points for coating gap and angle of attack are plotted to give the boundaries of the coating window. Outside of this window, the defects noted on the graph occurred. Thus, clearly, it is desirable to maintain the operation within the coating window.

It will be noted that more negative angles of attack usually result in lower downstream coating gaps due to the rotation of the die with respect to the web. For the graph of FIG. 14, a larger downstream coating gap is represented by an angle of attack which is less negative (less convergent in the direction of web travel). Thus, in accordance with another aspect of the present method, it is desirable to attempt to maintain the coating operation at those regions within the coating window where greater downstream lip coating gaps occur and where the angle of attack is just sufficient to avoid the ribbing defect. Operation in these regions will reduce elevated shear stresses that result in poor coating quality. However, at the same time, the coating gap must be sufficient to avoid recirculation below the middle lip.

These regions comprise a subset of the coating window which is referred to as the "quality window," and represents the area where coating quality is best. In addition, higher coating gaps (but not those that may result in excessively positive pressure gradients) are, in another way, desirable because they reduce the pressure drop along the bead and make it easier to seal at the upstream meniscus, and produce less penetration of the coating into the web.

The trade-off here is a larger risk with respect to perturbations. That is, in the quality window, especially at a lower angle of attack, operation occurs near a defect boundary ("ribbing" in the example of FIG. 14). A perturbation may cause coating conditions, at least for some duration, to fall outside the coating window, thus resulting in a defective product. Thus, it is optimal to pick a point of operation which is in the quality window but far enough away from the defect boundary such that common perturbations will not cause operations to fall outside the coating window.

It will be appreciated by those of ordinary skill that coating windows comprising graphs of other parameters are possible. For example, it is common to graph web speed versus layer thickness ratio. Any combination of two or three relevant coating parameters may be graphed in order to determine a coating window and an inner quality window.

Vacuum-Assisted Coating

It has been discovered that application of a uniform vacuum adjacent to and upstream over of the width of the coating bead facilitates formation of a stable steady state coating conditions. Furthermore, vacuum application may be used to enlarge the coating window, thereby increasing the ease and efficiency of the coating operation. Advantageously, increasing the coating gap results in less coated material penetrating the surface of the substrate, such as silicone into a paper surface.

Figure 19B:
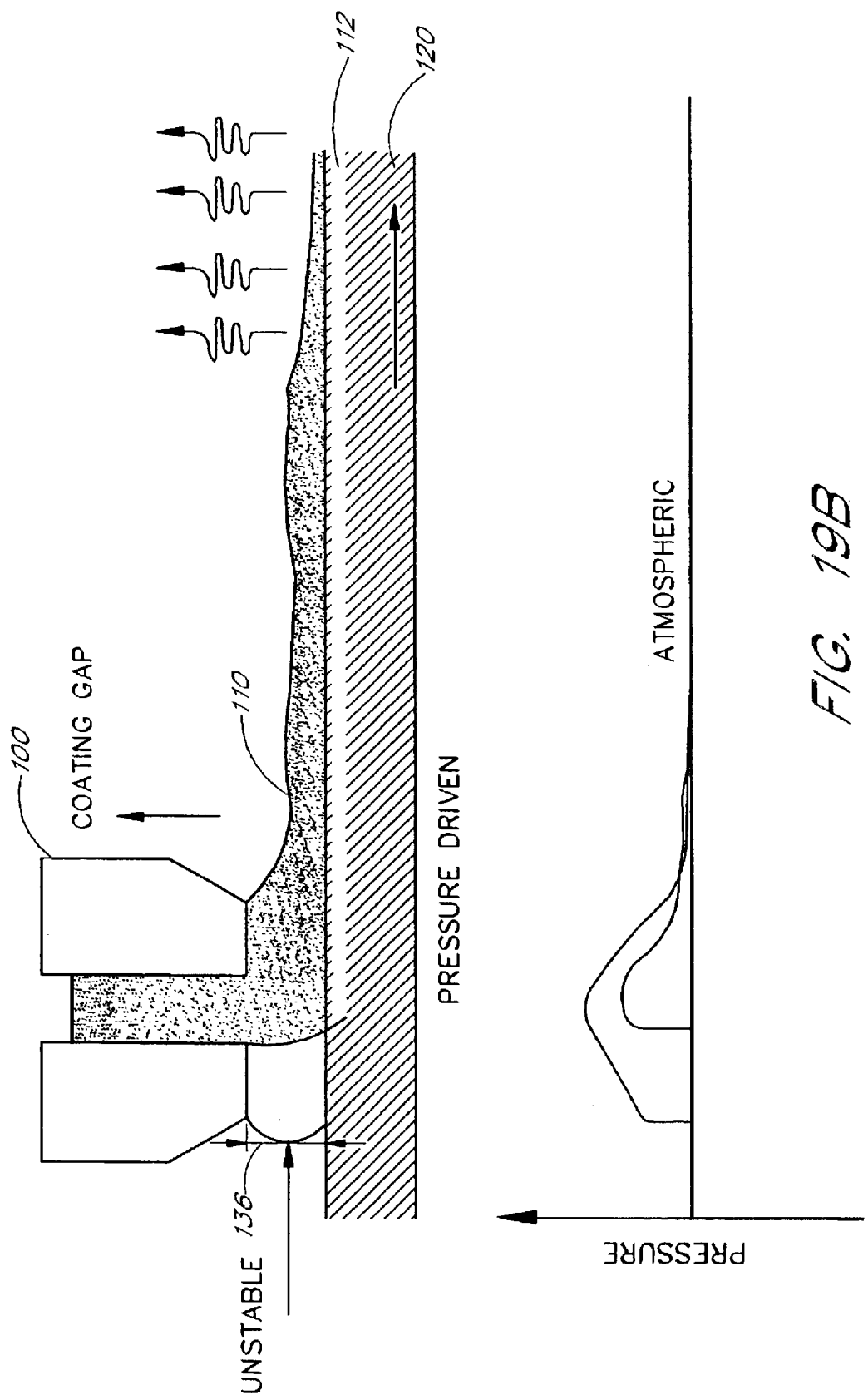

Conceptually, vacuum-assisted coating may be described with reference to FIGS. 19A–C. Referring to FIG. 19A, there is shown a schematic illustrative diagram of a single layer die 100 coating a layer 110 onto a paper substrate 120. The coating gap 130 has been selected in view of the principles discussed above, to provide for a proper pressure gradient to promote stable coating. Plotted below die 100 is the pressure gradient underneath the die and immediately downstream of the die 100. It should be noted that the pressure peaks just under the slot of die 100, then rapidly diminishes to atmospheric pressures at points downstream of die 100. Shown schematically in FIG. 19A, the pressure underneath die 100 is so great that it forces a portion 112 of layer 110 into the paper 120. This is undesirable, as material that is forced into the paper does not contribute to the desired properties of the layer. For example, where layer 110 is silicone, portion 112 does not contribute to release, and therefore is wasted.

To reduce the pressure under die 100, the coating gap between the die and the paper may be increased. This is depicted in FIG. 19B, where it is observed that the coating gap between the lips of die 100 and the surface of paper 120 has been increased from gap 135 to gap 136. Plotted below the schematic diagram of the die is the pressure gradient underneath the die and immediately downstream of the die. As expected, the resulting pressure gradient from the increased coating gap reflects a lower pressure underneath die 100. Consequently, the portion 112 of coated layer 110 forced into the surface of the paper is much less than that observed in FIG. 19A. However, larger gap 136 renders the coating bead upstream of the slot of die 100 unstable. This may lead to coating defects, detrimentally affecting coating efficiency.

Figure 19C:
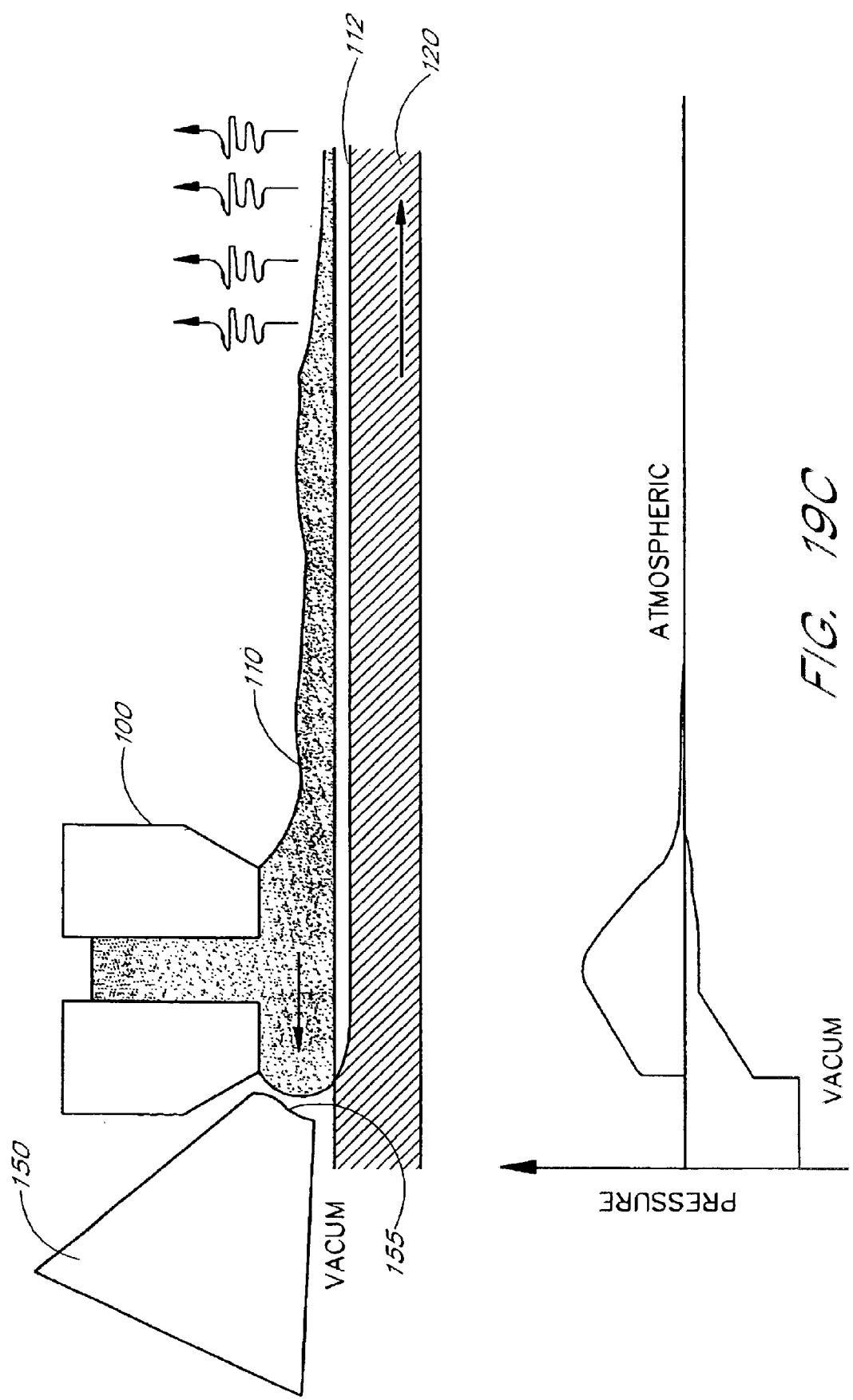

The benefits of vacuum assisted coating are shown in FIG. 19C, where the stability of the coating bead has been reestablished by application of a vacuum immediately upstream of die 100. This is done using vacuum box 150, having opening 155. Vacuum box 150 preferably has a width equal to or greater than the cross-web width of die 100. Opening 155 extends at least along the width of die 100 as well. Opening 155 is positioned upstream and adjacent to the coating bead, increasing the pressure gradient underneath the die until coating stability is established. However, the larger gap reduces the amounts of coated material forced into paper surface 120. Thus, using vacuum box 150, larger coating gap 136 may be used to coat layer 110, with little waste of coated material in portion 112 of the paper 120. Vacuum assisted coating is most applicable to low viscosity liquid coatings, which tend to be more responsive to vacuum assist.

Figure 20:
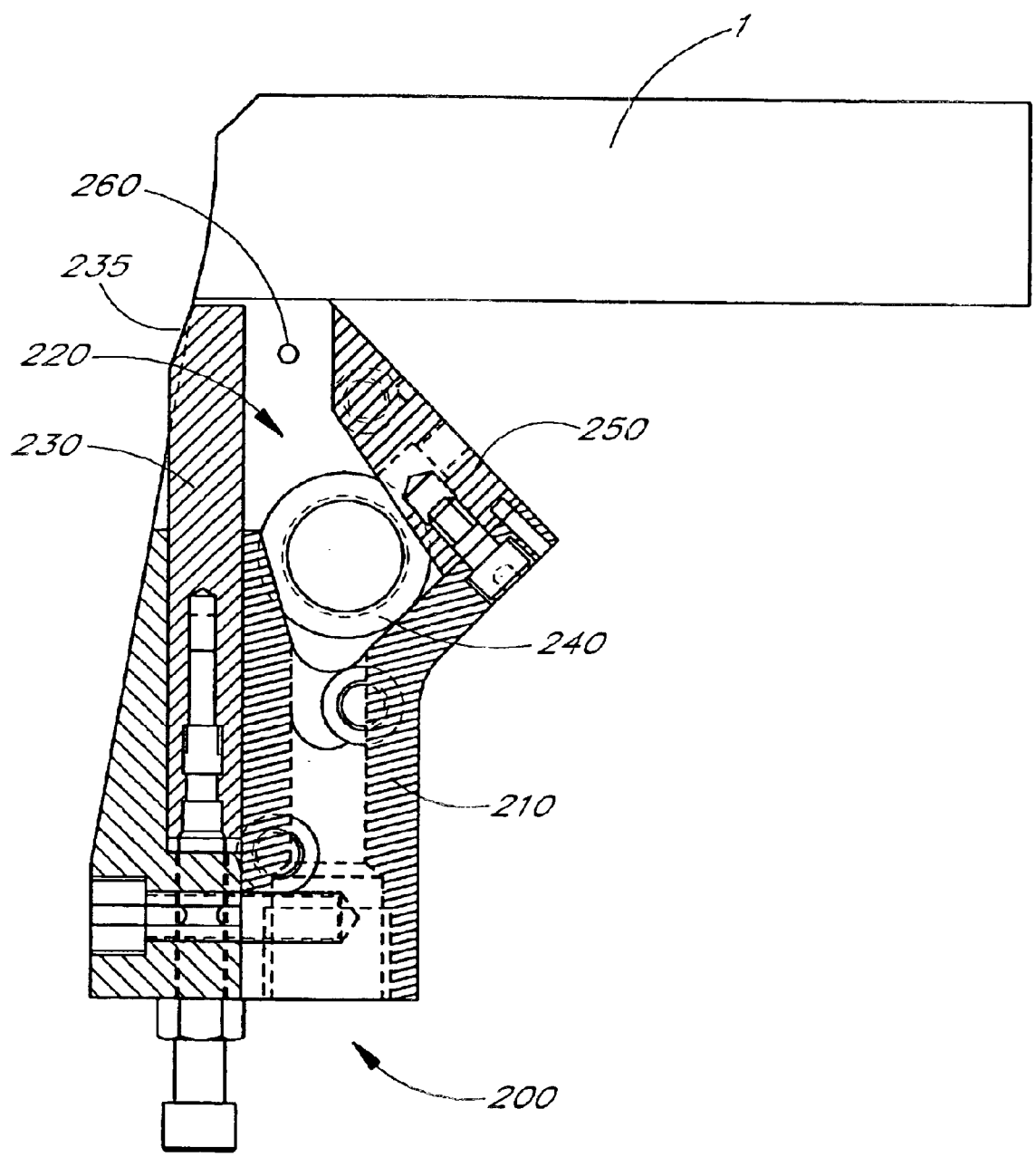
FIG. 20 is a cross sectional view of a vacuum box suitable for assisting die coating.

Referring to FIG. 20, there is shown a cross-section of one embodiment of a vacuum box for use in the vacuum-assisted coating embodiments of the present invention. Vacuum box 200 comprises a main body 210, side plates 220, blade 230, vacuum tube 240 and mounting bracket 250. Main body 210 preferably has a combined width equal to or greater than the width of the slot of the coating die. Side plates 220 are attached to main body 210 to form a substantially fluid tight seal capable of preserving the vacuum within the housing of vacuum box 200. Main body 210 and side plates 220 define a chamber 225 therein. Chamber 225 is in fluid communication with opening 260, such that an application of vacuum in the chamber will result vacuum box 260 introducing a vacuum force to the exterior environment via opening 260.

A blade 230 may also be inserted into vacuum box 200, as shown in FIG. 20. Preferably, blade 230 has a beveled bottom edge 235. In one embodiment, a vacuum is introduced into chamber 225 by a vacuum tube 240, which extends along the width of vacuum box 200 within chamber 225. Vacuum tube 240 is in fluid communication with a vacuum source (not shown). The vacuum source may be those conventionally known, such as vacuum pump and venturi and the like. Preferably, the vacuum source is at least capable of creating a vacuum of 1 to 250, more preferably from 25 to 200, and most preferably at least 50 to 75 cm of $H_2O$. In this embodiment, holes are drilled along vacuum tube 240 on its side opposite opening 260, such that application of a vacuum in tube 240 creates a vacuum in chamber 225 and thus through opening 260. Opening 260 may then be placed upstream and adjacent to the coating bead to affect the pressure gradients produced by the coated fluids.

It should be appreciated by those of skill in the art that many other embodiments can be used to form a vacuum box suitable to assist coating.

PRODUCTION EXAMPLE

A vacuum box, 24 inches across, made in accordance with the description above, was modified to allow measurements of vacuum at the coating bead in seven locations across the box. Uniformity of vacuum across the vacuum box was verified by offline measurements. Vacuum variability across the box was measured at less than 25 mm of $H_2O$ column ($2.5 \times 10^{-4}$ bar) standard deviation for all variable conditions.

A coating window was generated for AT-70 paper without vacuum assist to establish the maximum coating gap before the defect of chatter occurs. The single layer material coated consisted of a mixture of silicone and SBR, at 35% solids, for a 40:60 Si to SBR ratio. The die angle of attach was set at −2.0°, and the coating speed was set at 30 m/minute. The coating was applied at a target weight of 1.5 gsm dried silicone. A coating gap of 74 microns without vacuum was established. The bead was stable at this coating gap, and chatter and shirlastains were not observed. Coating gaps greater than 74 microns were observed to result in coating defects.

To establish the effects of vacuum on chatter, the gap was increased while increasing the level of vacuum. A coating window was established by adjusting the vacuum blade and level of vacuum such that the coating defect of chatter was completely eliminated. Good coating quality was established and the shirlastains were excellent (absence of pinholes), indicating improved coating. An increase in the coating gap of 70 μm to 100 μm was achieved. The die angle of attack (AOA) was −2.0°, and the level of vacuum was 25.6 cm of H$_2$O (0.0251 bar). A later study at −4.0° AOA indicates an increase in the range of coating gap is possible. Moreover, samples with good coating quality and excellent shirlastains were generated up to 90 m/minute with vacuum assist.

Curtain Coating

The present inventors have also found that curtain coating techniques may be used to form multilayer release surfaces, wherein a supporting layer is coated substantially simultaneously with a release layer. As generally known to those of skill in the art, in curtain coating, a liquid sheet is expressed from an apparatus such as a die, and falls freely over a distance until it impinges upon a moving substrate to be coated. The liquid sheet impacts the surface, and if coating conditions are properly controlled, forms a layer thereon. Curtain coating can be used to coat multiple layers by forming a multilayered liquid sheet to be expressed from the curtain coating apparatus. Those of skill in the art are directed to Kistler, et al. "Liquid Film Coating," published by Chapman & Hall, London (1997), the entirety of which is incorporated herein by reference, for its teachings on multilayer curtain coating techniques. See also Kistler, S. F., "The Fluid Mechanics of Certain Coating and Related Viscous Free Surface Flows with Contact Lines," Doctoral Thesis, University of Minnesota, November 1983.

For multilayer release surfaces, curtain coating has certain advantages over the dual die coaters discussed above. First, in curtain coating, the distance traveled by the liquid sheet from the die to the substrate may be hundreds of times greater than the gap between the die and the substrate used for dual die coating. Thus, curtain coating does not require as precise a control over the coating gap as is needed for dual die coating. Consequently, less experienced operators can/may successfully curtain coat multilayer release surfaces, and the coating efficiency may be higher. Indeed, it is quite common for gaps in certain coating to vary from 5 cm to 50 cm. Second, by its very nature, the fluid dynamics of curtain coating require one to exceed the low flow limit, i.e., a minimum volume (m. min) is needed to maintain curtain integrity. It can be readily understood that coating thickness and coating speed are coupled. A decrease in coating thickness from 30 μm to 25 μm requires a 30/25 increase (compensational in line speed to maintain curtain integrity. This explains why curtain coating is considered high speed coating processes. Thus, curtain coating techniques may be used to forms multilayer release surfaces more quickly than dual die techniques.

The support, release layers and substrates which may be curtain coated using the present invention are those described above. It has been observed, however, that stable multilayer liquid sheets are easier to achieve when the dynamic surface tension of the liquid layers making up the multilayer sheet are approximately the same. Where dynamic surface tensions are too different, the curtain tends to break apart prior to contacting the moving web underneath. To minimize or perhaps overcome problems associated with surface tension differences, surfactants may be used to optimize curtain coating processes of the present invention. In some instances, addition of surfactants may not be sufficient to establish a stable curtain. For these types of materials, the dual die coating techniques discussed previously can generally be used to form multilayer release surfaces, as the close proximity of the dual die to the substrate makes surface tension effects much less important.

Figure 21:
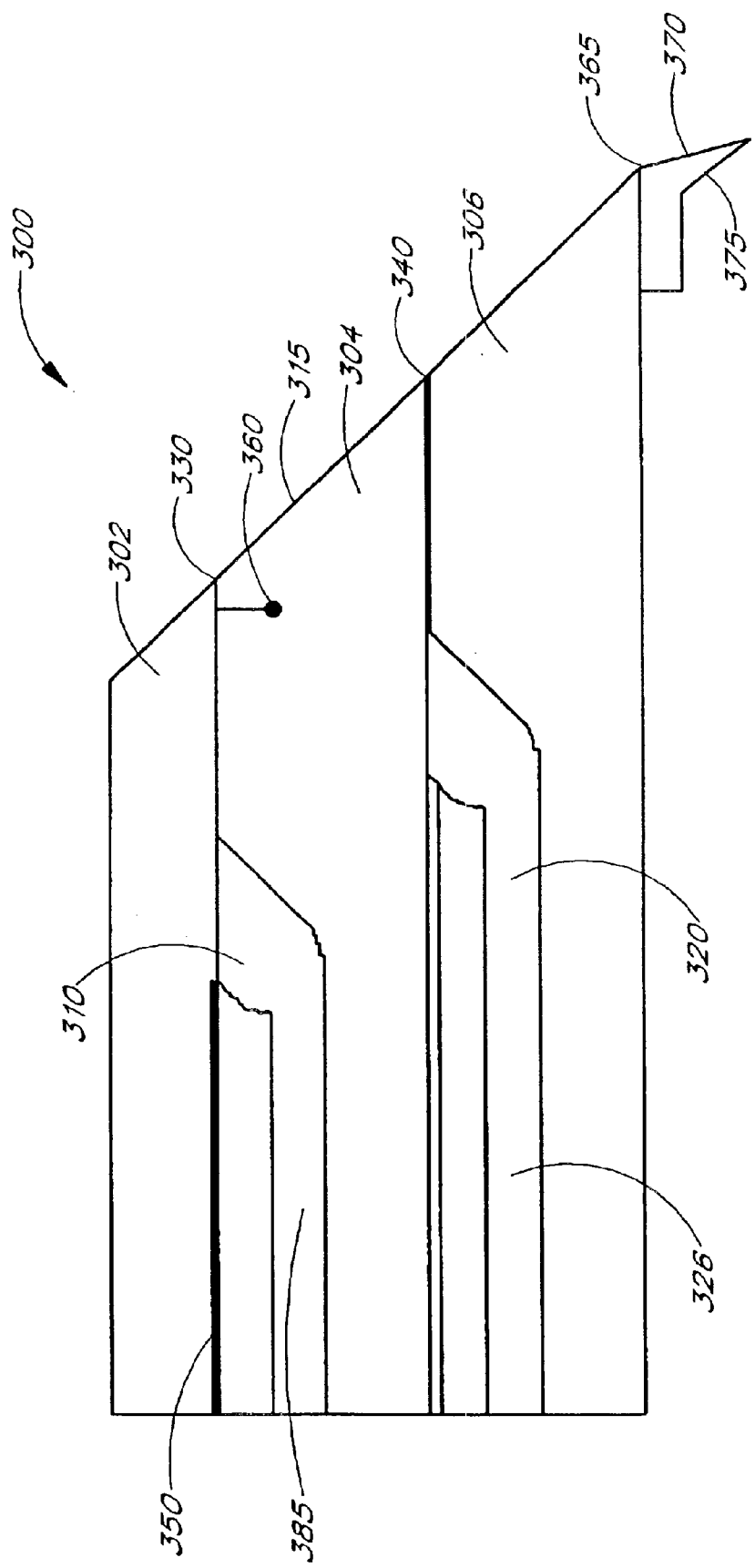
FIG. 21 is a schematic cross-sectional view of a curtain coating die which may be used to form multilayer release surfaces.

Referring to FIG. 21, there is shown a schematic cross section of slide coater 300 which may be used to curtain coat multilayer release surfaces. Slide coater 300 comprises an upper solid portion 302, a middle solid portion 304, and a lower solid portion 306. The solid portions define the outer die surface. Solid portions 302, 304 and 306 may be made out of any material known to those of skill in the art to be useful for forming precision dies, such as stainless steel, 316 stainless steel, 15-5 HP steel, and other non-corrodible metals used to make dies. The dimensions of the solid portions may vary, depending particular coating needs. Solid portions 302, 304 and 306 should, however, be at least as wide as necessary to accommodate slots of the desired width of the liquid sheet to be coated on the substrate. Moreover, where it is desirable to coat the entirety of the substrate between its lateral edges, the die used should be wide enough to accommodate slots wider than the substrate. One particular set of dimensions found useful for successfully coating multilayer release constructs appears in FIG. 21. Solid portions 302, 304 and 306 may be joined together by conventional methods known to those of skill in the art, such as body bolts.

A horizontal or inclined first slot 330 is formed between upper portion 302 and middle portion 304. An incline prevents air pockets from being trapped inside the die with the risk of air bubbles being generated along with the metered fluid, which could lead to curtain break-up and/or ellipsoid shaped coating defects. Slot 330 is in fluid communication with manifold 310, such that fluids passing through supply pipe 325 and into manifold 310 will enter slot 330 and be expressed/metered as a first layer from die 300 along face surface slide portion 315. A horizontal (or inclined) second slot 340 is formed between middle portion 304 and lower portion 306. Slot 340 is in fluid communication with manifold 320, such that fluids passing through supply pipe 326 into manifold 320 will enter slot 340 and be expressed/metered as a second layer from die 300 along face surface slide portion 315. Manifolds 310 and 320 extend across slide coater 300 to feed slots 330 and 340. Preferably, manifolds 310 and 320 slope downward from the center of slide coater 300 to its lateral edges (i.e., shallow inverted v shape), to facilitate fluid flow along the length of the manifold.

As known to those of skill in the art, fluids flowing through slots such as slots 330 and 340 experience parabolic fluid flow. When fluids are expressed/metered from slots 330 and 340 and slide across the face of the die, the fluid flow converts from parabolic flow to semi-parabolic flow. Once the fluid flow has converted to semi-parabolic, it is capable of forming a multilayer liquid sheet described herein.

The first and second layers meet at slot 340, to form the multilayer liquid sheet to be coated. The fluid metered from slot 330 flows over the fluid metered from slot 340. In one preferred embodiment, slot 330 and slot 340 are substantially parallel, although parallel alignment of such slots is not essential to successful curtain coating. Shims 350 or other means may be inserted/used between the solid portions to adjust the dimensions of slots 330 and 340. The slots used in curtain coating dies may vary in opening as necessary to establish a successful multilayer curtain. Suitable openings for slots of slide coater 250 are from 200 to 1000 microns, with 300–600 microns being preferred. The distance along face 315 between slot 330 and 340, known as the "slide distance," should be sufficient to permit fluid flow to convert from parabolic flow to semi-parabolic flow. For slide coater 300, this slide length is about 60 mm. Depending upon the materials being coated, slide distances of from 10 to 100 mm are suitable. Unduly long distances between slots should be avoided, so as not to create opportunities for fluid instabilities. As a general rule, the slide distance should be about 5–20 times the fluid thickness of the layer on the slide.

Although die 300 is depicted as having only two slots, it should be appreciated by those of skill in the art that the teachings set forth herein may be used to create dies having three or more slots. For example, a manifold may be formed in upper portion 302, and a cap portion applied thereover to form a third slot (not shown) for expression of an additional fluid layer.

As shown in FIG. 21, the angle of face surface 315 with respect to the bottom surface of bottom portion 306 is 45°. This angle may be varied to optimize the curtain coating process to the particular multilayer release materials being coated. Generally, the more viscous the material being coated, the greater the tilt angle desired for the face of the die. Tilt angles may vary from 10 to 60 degrees on average, with a range of 20–45 degrees being preferred for silicone release systems comprising a silicone containing release layer being coated within an SBR support layer. It should be appreciated by those of skill in the art that angles outside of these ranges may still work, albeit sometimes not as effectively.

In order to optimize curtain coating conditions, it is preferred to adjust the design of lip 365 of slide coater 300. If unmodified, fluid flowing to lip 365 would tend to migrate under bottom portion 306, disrupting stable curtain flow. To correct for this, a slide block 370, is mounted to the bottom surface of bottom portion 306. Slide block 370 bends downward at a sharper angle than face surface 315, to form a more stable curtain. The underside 375 of slide block 370 is formed to have a sharp inclination, to prevent the liquid sheet material leaving the edge of slide block 370 from flowing under block 370. The angle formed between the front and back face of block 370 may vary, with 0 to 35 degrees being preferred.

In use, die 300 produces a liquid sheet having two layers as it falls from slide block 370. Conventionally, the substrate is a moving web of paper traveling first underneath the manifold and then away from block 375. Thus, the first and uppermost layer is formed by liquid metered from slot 330. For multilayer release surfaces then, slot 330 will meter the silicone containing compositions described previously. A second layer is formed by metering a liquid through slot 340. The second layer is covered by the first layer as the first flows over slot 340. For multilayer release surfaces, the second layer is formed by the supporting layer materials described previously.

As shown in FIG. 21, upper, middle and lower solid portions 302, 304 and 306 are joined to form a face surface which is flat. In an alternate embodiment, middle portion 304 may be adjusted to extend outward from face 315 by a distance equal to the thickness of the layer formed from slot 340. By making this adjustment, the layer formed from slot 330 may flow directly onto and over the layer formed from slot 340, minimizing the opportunity for undesirable interfacial effects between the layers where they meet.

Curtain coating efficiency is greatly improved if edge guides are used in conjunction with the coating die. Edge guides are rods or struts which extend down from the lateral edges of the slots of the die, to almost touch the surface of the moving web underneath. The edge guides provide a surface for the lateral edges of the multilayer liquid sheet to flow upon. In the absence of such a surface, the curtain tends to collapse inward. Thus, edge guides promote stability in curtain coating. For purposes of the present invention, many different types of edge guides as know to those of skill in the are suitable. One example is an edge guide sold by Bachofen+Meier AG, Bulach, Germany as Seitenblech zur Duse. Other suitable edge guides include those described in the many issued U.S. Patents, such as U.S. Pat. No. 5,976,251, incorporated herein by reference.

A metering pump (or pumps) may be used to pump the fluids making up the two layers into the manifolds of slide coater 300. A preferred metering pump is pulse free and precise, such as those sold by Zenith as series C9000, Waukesha Universal 15, or other suitable metering pumps may be used. The metering pump is adjusted to provide the desired flow rate for the coating application, such that a steady stream is supplied to the manifolds and slots 330 and 340. Depending on the specific process conditions, fluid rheology and the die design, the fluid pressure in the manifolds may vary from 0.15 to 10 psi, depending upon the viscosity of the liquid being coated. As should be appreciated, higher viscosity fluids, such as liquids with a high solids content, require higher pressures to establish steady state flow through.

The flow rate of the material is dictated by the web speed and designed coating thickness. Generally, there is a minimum flow rate of from 6 or less L/(m.min) to establish a stable curtain. The maximum flow rate, which is dictated by line speed and coating thickness requirements, may exceed 30 L/m.min. Within these extremes, the speed of the web may be adjusted to achieve the desired coating thickness, as is known to those of skill in the art.

For curtain coating, the web moving underneath the die typically travels from 1.0 or less up to 20 m/s or more. This generates a great deal of air pressure near the surface of the web moving toward the falling liquid curtain. To prevent this moving air from disrupting the curtain, an air shield should be used. The present inventors have found a soft rubber material, attached to a plexi glass, having a width greater than the substrate and a height of 120 mm, to be sufficient, but other more optimum devices may be used. The air shield is positioned from 1.0 cm (or less where practical) to 10 cm behind the curtain. A plastic material of suitable thickness and stiffness may be used to keep the laminar air layer, dragged in by the moving substrate, away from the liquid curtain. The soft rubber material makes very light/sufficient contact with the web. Alternate designs may include those disclosed in U.S. Pat. No. 5,224,996, the entirety of which is incorporated herein by reference.

Another important variable to control is the air content of the fluids being coated. Air bubbles in the curtain will transiently disrupt it, greatly diminishing coating efficiency. Consequently, the fluids to be curtain coated should be deaerated prior to being pumped into the curtain coating die. Any of the known methods of deaeration are acceptable. For example, one suitable apparatus is a Versator sold by Cornell Machine, Springfield, N.J. Alternatively, other deaeration methods may be used, such as those sold by Fryma AG, Rheinfelder, Switzerland, or thin film evaporators.

It should be readily appreciated that dies of different designs may also be used to curtain coat the multilayer release constructs of the present invention. For example, Liquid Film Coating, Kistler et al, describes several different designs of curtain coating dies which may be adapted to coat multilayer release surfaces. These alternate designs include inverted slot-fed type curtain dies (Kistler et al, FIG. 11c.4), reverse slide type curtain dies (Kistler et al, FIG. 11c.5), slide-fed type curtain dies (Kistler FIG. 11c.3) and merging slide-fed curtain coating dies (Kistler et al, FIG. 11c.6). Among these various types of coaters, the present inventors have found that it is easier to optimize the coating process if slide type coaters are used.

PRODUCTION EXAMPLE

Figure 22:
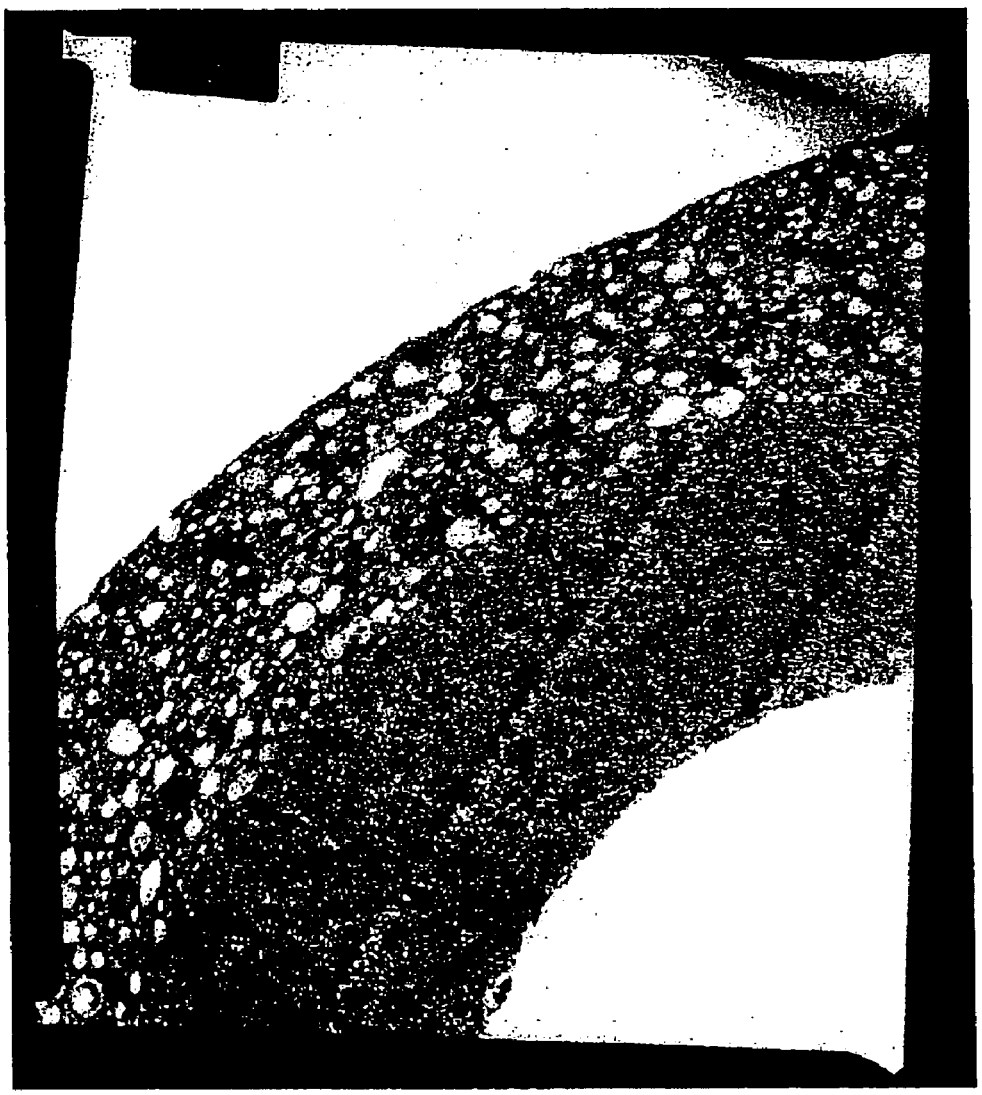
FIG. 22 is a TEM of a cross-section of a multilayer release surface formed by curtain coating.

A multilayer release surface was created using curtain coating techniques as follows. A release layer was formed from a silicone/SBR mixture, with a ratio of 30:70 silicone to SBR, undiluted to 50% solids. A release support layer was formed from SBR, undiluted to 50% solids. The release support layer was coated to a weight of 6 g/m$^2$, and the release layer was coated to a weight of 4 g/m$^2$. The flow rate was 7 liters/meter-minute. Each layer was coated substantially simultaneously onto Data-70 paper using a curtain coating die similar to that described above. The die was mounted on a pilot coater. The coating web speed was 350 m/min. A tungsten wire was placed underneath the web at the position where the curtain impacts the substrate. A voltage differential of 25 kV was applied during the coating operations. This (additional) body force, which pins the dynamic contact line between the fluid and the moving substrate contributes in achieving the desired coat quality over a much wider operating window. The voltage differential causes the falling multilayer liquid web to impact the with slightly more force than that imparted by gravity. A TEM of a cross section of the resulting multilayer release surface is shown in FIG. 22. As shown in FIG. 22, the boundary between the release layer and the release support layer is much sharper than that generated by dual die coating, with less intermixing of adjacent layers. Thus, curtain coating techniques may be used when it is desirable to achieve a more well defined boundary between the support layer and the release layer.

Trouble Shooting

During production, as just noted, perturbations or other irregularities may occur that introduce defects into the quality of the film. Thus, it is advantageous, in accordance with the method of the present invention, to be able to correct such defects as soon as possible, in order to minimize their degree and duration. If possible, such "trouble shooting" should occur during coating so that operations do not have to cease.

One of the more common defective conditions, as described above, is upstream leakage. If this occurs during operation, the coating gap may be increased to reduce the pressure drop along the bead. Alternatively, the elimination of upstream leakage may be accomplished by a change of die angle of attack which produces a higher downstream coating gap and a lower upstream coating gap (i.e., a less negative angle of attack). Other means, such as liquid viscosity adjustment, can be used to control upstream leakage.

Another defect is "de-wetting." If, in the film forming region, a perturbation affects the surface of the film, one or more layers may retract from the underlying layers or substrate leaving a void. This condition can be corrected by lowering the surface tension of the upper layers by, for example, increasing the surfactant in those layers. Also, the coating speed can be reduced in order to maintain the dynamic surface tension of the liquid of the film forming region at or below the stable level.

In conclusion, the method of the present invention represents a marked advancement in the multilayer coating art. It should be understood that the scope of the present invention is not to be limited by the illustrations or foregoing description thereof, but rather by the appended claims, and certain variations and modifications of this invention will suggest themselves to one of ordinary skill in the art.

What is claimed is:

1. A method of making a multilayer release liner, comprising:
providing a dual die comprising an upstream lip, a middle lip and a downstream lip, a first slot formed between the upstream lip and the middle lip and a second slot formed between the middle lip and the downstream lip;
depositing a support layer from the first slot of the dual die on a backing; and
substantially simultaneously depositing a release layer that comprises silicone from the second slot of the dual die on the support layer while controlling flow at an interface between the release layer and the support layer at a separating line by positioning the separating line at a downstream corner of the middle lip of the dual die, the flow at the interface between the release layer and the support layer being controlled for achieving domains of the silicone from the release layer in the support layer sufficient to bond the release layer to the support layer and for defining a substantially continuous release surface across the multilayer release liner.

2. The method of claim 1, wherein a greater concentration of silicone is present in points within the release layer nearer to the release surface.

3. The method of claim 1, wherein more than 50% of the silicone is within 2 micrometers from the release surface.

4. The method of claim 1, wherein more than 70% of the silicone is within 2 micrometers from the release surface.

5. The method of claim 1, wherein the silicone distribution is nonlinear to a total silicone content of at least 70%.

6. The method of claim 1, wherein the silicone distribution is nonlinear to a total silicone content of at least 90%.

7. The method of claim 1, wherein the length of the downstream lip is 0.1 to 3 mm.

8. The method of claim 7, wherein the length of the downstream lip is 0.8 to 1.2 mm.

9. The method of claim 1, wherein the length of the middle lip is 0.1 to 3 mm.

10. The method of claim 9, wherein the length of the middle lip is 0.3 to 0.7 mm.

11. The method of claim 1, wherein the length of the upstream lip is 1.0 to 3.0 mm.

12. The method of claim 11, wherein the length of the upstream lip is 1.5 to 2.5 mm.

13. The method of claim 1, wherein the viscosity of a liquid used to form the silicone layer is greater than the viscosity of a liquid used to form the support layer.

14. The method of claim 1, wherein the surface tension of a liquid used to form the silicone layer is lower than the surface tension a liquid used to form the support layer.

15. The method of claim 1, wherein the backing is selected from the group consisting of machine finished papers, machine glazed papers, bag paper, calendared and non-calendared clay coated paper, latex saturated paper, polymeric films and combinations thereof.

16. The method of claim 1, wherein the support layer comprises a filler material.

17. The method of claim 16, wherein the filler material is selected from the group consisting of emulsions or water dispersions of latexes, cross-linkable latexes, water soluble polymers, polyvinyl alcohols, carboxymethylcellulose, starch, ethylene vinyl acetate, calcium carbonate, emulsions in water dispersions of styrene butadiene latex, and styrene butadiene rubber compounds.

18. A method of making a multilayer release liner, comprising:
moving a substrate in proximity to a dual die having first and second slots;
dispensing a support layer from the first slot and onto the substrate; and
dispensing a release layer that comprises silicone from the second slot and onto the support layer, so that the release layer defines a substantially continuous release surface facing away from the support layer, the release layer and the support layer being dispensed at the dual die to achieve domains of the silicone from the release layer in the support layer sufficient to bond the support layer to the release layer and to provide a greater concentration of silicone in points nearer to the release surface.

19. A method of making a multilayer release liner, comprising:

moving a substrate in proximity to a dual die having first and second slots;

dispensing a support layer from the first slot and onto the substrate; and dispensing a release layer that comprises silicone from the second slot and onto the support layer, so that the release layer includes a substantially continuous release surface facing away from the support layer, the release layer and the support layer being dispensed at the dual die so that domains of the silicone from the release layer are defined in the support layer sufficient to bond the support layer to the release layer and so that more than 50% of the silicone is within 2 $\mu$m from the release surface.

* * * * *